United States Patent
Shao et al.

(10) Patent No.: US 10,374,770 B2
(45) Date of Patent: Aug. 6, 2019

(54) METHOD, APPARATUS AND SYSTEM FOR UPLINK INFORMATION DEMODULATION

(71) Applicant: HUAWEI TECHNOLOGIES CO., LTD., Shenzhen, Guangdong (CN)

(72) Inventors: Jiafeng Shao, Beijing (CN); Sha Ma, Beijing (CN); Chaojun Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/919,687

(22) Filed: Mar. 13, 2018

(65) Prior Publication Data
US 2018/0205517 A1    Jul. 19, 2018

Related U.S. Application Data

(63) Continuation of application No. PCT/CN2015/089502, filed on Sep. 14, 2015.

(51) Int. Cl.
*H04L 1/00* (2006.01)
*H04L 5/00* (2006.01)
(Continued)

(52) U.S. Cl.
CPC .......... *H04L 5/0051* (2013.01); *H04L 1/0025* (2013.01); *H04L 1/0039* (2013.01);
(Continued)

(58) Field of Classification Search
CPC ..................................................... H04L 5/0051
(Continued)

(56) References Cited

U.S. PATENT DOCUMENTS

2012/0115423 A1\* 5/2012 Sang .................. H04L 27/2657
455/75
2012/0276896 A1\* 11/2012 Ren ...................... H04L 1/0003
455/423

(Continued)

FOREIGN PATENT DOCUMENTS

CN        101753168        6/2010
CN        102835149        12/2012
(Continued)

OTHER PUBLICATIONS

International Search Report, dated Jun. 13, 2016, in International Application No. PCT/CN2015/089502 (4 pp.).
(Continued)

*Primary Examiner* — Shripal K Khajuria
(74) *Attorney, Agent, or Firm* — Staas & Halsey LLP

(57) ABSTRACT

Embodiments of the present disclosure provide an uplink information demodulation method, an apparatus, and an uplink information demodulation system. and relate to the field of communications technologies. After an MCS index is selected for a terminal device, reduction processing is performed on the MCS index according to a preset MCS index reduction exponent, a reduced MCS index is indicated to the terminal device, frequency offset estimation is performed on the terminal device by using a recorded historical frequency offset value, and a PUSCH sent by the terminal device according to the reduced MCS index is demodulated after the frequency offset estimation. A frequency offset value is determined by using the prerecorded historical frequency offset value, so that the frequency offset value does not need to be determined in an existing manner of adding a DM-RS symbol to a 0.5-millisecond TTI.

17 Claims, 9 Drawing Sheets

(51) Int. Cl.
   *H04L 27/144* (2006.01)
   *H04L 1/18* (2006.01)
   *H04L 1/20* (2006.01)
   *H04W 72/04* (2009.01)
   *H04W 72/08* (2009.01)

(52) U.S. Cl.
   CPC ............ *H04L 1/1812* (2013.01); *H04L 1/203* (2013.01); *H04L 5/0007* (2013.01); *H04L 5/0044* (2013.01); *H04L 5/0057* (2013.01); *H04L 27/144* (2013.01); *H04W 72/042* (2013.01); *H04W 72/0446* (2013.01); *H04W 72/085* (2013.01); *H04L 1/0003* (2013.01); *H04L 1/0009* (2013.01)

(58) Field of Classification Search
   USPC .......................................................... 370/330
   See application file for complete search history.

(56) References Cited

U.S. PATENT DOCUMENTS

| | | | |
|---|---|---|---|
| 2015/0200746 A1* | 7/2015 | Pan | ............................ H04L 1/00 370/329 |
| 2017/0064678 A1 | 3/2017 | Park et al. | |

FOREIGN PATENT DOCUMENTS

| | | |
|---|---|---|
| CN | 104641582 A | 5/2015 |
| WO | 2011006352 A1 | 1/2011 |
| WO | WO2014015829 | 1/2014 |

OTHER PUBLICATIONS

Written Opinion of the International Searching Authority, dated Jun. 13, 2016, in International Application No. PCT/CN2015/089502 (7 pp.).

LG Electronics, "Discussion on D2D Discovery Physical Layer Design," 3GPP TSG RAN WG1 Meeting #77, R1-142145, Seoul, Korea, May 19-23, 2014, pp. 1-9.

Ericsson, "Study of shorter TTI for latency reduction," 3GPP TSG-RAN WG2 #91, Tdoc R2-153493, Beijing, China, Aug. 24-28, 2015, pp. 1-5.

Extended European Search Report, dated Jul. 30, 2018, in European Application No. 15903787.8 (12 pp.).

Office Action, dated Apr. 24, 2019, in Chinese Application No. 201580067247.8 (7 pp.).

* cited by examiner

METHOD, APPARATUS AND SYSTEM FOR UPLINK INFORMATION DEMODULATION

CROSS-REFERENCE TO RELATED APPLICATIONS

This application is a continuation of International Application No. PCT/CN2015/089502, filed on Sep. 14, 2015, the disclosure of which is hereby incorporated by reference in its entirety.

TECHNICAL FIELD

The present disclosure relates to the field of communications technologies. and in particular, to an uplink information demodulation method, an apparatus. and an uplink information demodulation system.

BACKGROUND

In an LTE (long term evolution) system, received-signal orthogonality depends on a scenario in which a transmitter and a receiver work on completely the same frequency reference points. If frequency reference points are not completely the same, subcarrier orthogonality is damaged, and a subcarrier leakage is caused. To avoid the subcarrier leakage, a base station needs to perform frequency offset estimation on a terminal device, and calibrate a frequency of the terminal device by using an estimated frequency offset value.

A TTI (transmission time interval) in a current LTE system is 1 millisecond. In an uplink in the current LTE system, on a PUSCH (physical uplink shared channel), DM-RSs (Demodulation RS, demodulation reference signal) are sent on two SC-FDMA (single carrier frequency division multiple access) symbols at each 1-ms TTI, so that a base station measures and estimates an uplink channel. In addition, the base station performs, according to a phase difference between the two DM-RS symbols, frequency offset estimation and frequency calibration on a PUSCH sent by a terminal device.

To achieve a shorter round trip time and a shorter data transmission delay. an evolution scheme of the current LTE system has proposed a scenario in which a TTI length is set to 0.5 millisecond or to be shorter than 0.5 millisecond. Correspondingly, after the TI length in the LTE system changes from 1 millisecond to 0.5 millisecond, according to a prior-art signal structure, a DM-RS used to estimate an uplink frequency is sent on only one symbol. Consequently, the base station cannot perform accurate uplink frequency offset estimation and calibration on the terminal device by using the DM-RS on the symbol.

To resolve a problem occurring when uplink information is demodulated at a 0.5-millisecond TTI, a most intuitive solution is to add a DM-RS symbol to the 0.5-millisecond TTI. In this way, the base station can perform accurate uplink frequency offset estimation by using DM-RSs on two SC-FDMA symbols.

However, because the DM-RS symbol is added to the 0.5-millisecond TTI, such additional reference signal overhead results in a smaller capacity of data that can be transmitted at the 0.5-millisecond TTI. In this manner, data transmission efficiency is reduced, and reference signal system overheads are increased.

SUMMARY

To resolve the prior-art disadvantages, embodiments of the present disclosure provide an uplink information demodulation method, an apparatus, and an uplink information demodulation system. The technical solutions are as follows:

According to a first aspect, an embodiment of the present disclosure provides an uplink information demodulation method, including:

selecting, by a base station, a first modulation and coding scheme MCS index for a terminal device according to channel quality of the terminal device and/or a received target block error rate BLER of a physical uplink shared channel PUSCH of the terminal device;

determining, by the base station, a second MCS index according to an MCS index reduction value and the first MCS index, where the MCS index reduction value is used to perform reduction processing on the first MCS index to obtain the second MCS index;

sending, by the base station, the second MCS index to the terminal device;

performing, by the base station, frequency offset calibration on a frequency of the terminal device according to a historical frequency offset value of the terminal device, where the historical frequency offset value is a frequency offset value of the terminal device that is stored in the base station; and receiving, by the base station, uplink information sent by the terminal device according to the second MCS index, and demodulating the PUSCH according to a frequency obtained after the frequency offset calibration.

In a first possible implementation of the first aspect, the method further includes:

after the terminal device performs 1-millisecond-TTI uplink information transmission, determining, by the base station, a frequency offset value of the terminal device according to DM-RSs on a PUSCH that is at a 1-millisecond TTI and sent by the terminal device; and determining, by the base station, the historical frequency offset value of the terminal device according to the frequency offset value of the terminal device.

In a second possible implementation of the first aspect, the method further includes:

after detecting that the terminal device reaches a first estimation threshold, sending, by the base station, at least one piece of first resource indication information to the terminal device, where the first resource indication information is used to indicate uplink frequency domain resources for PUSCHs at two 0.5-millisecond TTIs, and that the base station detects that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of hybrid automatic repeat request HARQ retransmission times of a PUSCH of the terminal device, an error rate or a quantity of errors of a Media Access Control MAC packet/Radio Link Control RLC packet/Transmission Control Protocol TCP packet/Internet Protocol IP packet of the terminal device, a quantity of automatic repeat requests ARQs of a MAC packet of the terminal device, or quality of service QoS of a service corresponding to the terminal device;

receiving, by the base station, the PUSCHs that are at the two 0.5-millisecond TTIs and sent by the terminal device, where the uplink frequency domain resources for the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer;

determining, by the base station, a frequency offset value of the terminal device according to two DM-RSs on the PUSCHs at the two 0.5-millisecond TTIs or according to two DM-RSs in frequency domains with a same PRB index or a same RBG index on the PUSCHs at the two 0.5-millisecond TTIs; and determining, by the base station, the historical frequency offset value of the terminal device according to the frequency offset value of the terminal device.

In a third possible implementation of the first aspect, the method further includes:

after detecting that the terminal device reaches a first estimation threshold, sending, by the base station, mode instruction information to the terminal device, where the mode instruction information is used to instruct the terminal device to change from a mode of sending 0.5-millisecond-TTI uplink information to a mode of sending 1-millisecond-TTI uplink information, where that the base station detects that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device:

receiving, by the base station, a PUSCH that is at a 1-millisecond TTI and sent by the terminal device;

determining, by the base station, a frequency offset value of the terminal device according to DM-RSs on the PUSCH that is at the 1-millisecond TTI and sent by the terminal device; and determining, by the base station, the historical frequency offset value of the terminal device according to the frequency offset value of the terminal device.

In a fourth possible implementation of the first aspect, the method further includes:

after detecting that the terminal device reaches a first estimation threshold, sending, by the base station, at least one piece of second resource indication information to the terminal device within a preset time interval contiguous to a moment at which the terminal device sends a sounding reference signal SRS, where the second resource indication information is used to indicate an uplink frequency domain resource for a PUSCH at a 0.5-millisecond TTI, and that the base station detects that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

receiving, by the base station, the PUSCH that is at the 0.5-millisecond TTI and sent by the terminal device, and receiving, by the base station, the SRS sent by the terminal device, where the uplink frequency domain resource for the PUSCH sent at the 0.5-millisecond TTI includes at least one same frequency domain resource as an uplink frequency domain resource on which the SRS is located, the preset time interval is less than or equal to m*0.5 milliseconds, and m is a non-zero integer;

determining, by the base station, a frequency offset value of the terminal device according to the SRS and a DM-RS on the PUSCH at the 0.5-millisecond TTI or according to a DM-RS and an SRS that are on the same frequency domain resource in the SRS as on the PUSCH at the 0.5-millisecond TTI; and determining, by the base station, the historical frequency offset value of the terminal device according to the frequency offset value of the terminal device.

In a fifth possible implementation of the first aspect, the method further includes:

after detecting that the terminal device reaches a first estimation threshold. sending, by the base station, random access procedure indication information to the terminal device by using a physical downlink control channel PDCCH, where the detecting that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

receiving, by the base station, an uplink channel that is in the random access procedure and sent by the terminal device according to the random access procedure indication information;

determining, by the base station, a frequency offset value of the terminal device according to a DM-RS and/or a preamble sequence on the uplink channel that is in the random access procedure and sent by the terminal device, where the uplink channel includes a physical random access channel PRACH and/or a PUSCH; and determining, by the base station, the historical frequency offset value of the terminal device according to the frequency offset value of the terminal device.

In a sixth possible implementation of the first aspect, the method further includes:

receiving, by the base station, an uplink channel that is in a random access procedure and sent by the terminal device after the terminal device detects that the terminal device reaches a second estimation threshold. where the uplink channel includes a PRACH and/or a PUSCH. and the second estimation threshold includes: one or more of the following parameters reach a specified threshold: a moving speed of the terminal device, a difference between an expected MCS index value and an MCS index received by the terminal device, or a difference between an MCS index received by the terminal device and an MCS index corresponding to a channel quality indicator CQI reported by the terminal device:

determining, by the base station, a frequency offset value of the terminal device according to the uplink channel in the random access procedure triggered by the terminal device after the terminal device detects that the terminal device reaches the second estimation threshold, where the uplink channel includes the PRACH and/or the PUSCH; and determining, by the base station, the historical frequency offset value of the terminal device according to the frequency offset value of the terminal device.

According to a second aspect, an embodiment of the present disclosure provides an uplink information demodulation method, including:

receiving, by a terminal device, a second modulation and coding scheme MCS index, where the second MCS index is obtained after a base station performs reduction processing on a first MCS index according to an MCS index reduction value, and the first MCS index is selected by the base station according to channel quality of the terminal device and/or a received target block error rate BLER of a physical uplink shared channel PUSCH of the terminal device; and sending, by the terminal device, uplink information according to the second MCS index.

In a first possible implementation of the second aspect, the method further includes:

receiving, by the terminal device, at least one piece of first resource indication information, where the first resource indication information is used to indicate uplink frequency domain resources for PUSCHs at two 0.5-millisecond TTIs, the uplink frequency domain resources for sending the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer; and sending, by the terminal device, the PUSCHs at the two 0.5-millisecond TTIs according to the first resource indication information.

In a second possible implementation of the second aspect, the method further includes:

receiving, by the terminal device, mode instruction information, where the mode instruction information is used to instruct the terminal device to change from a mode of sending 0.5-millisecond-TTI uplink information to a mode of sending 1-millisecond-TTI uplink information:

changing, by the terminal device according to the mode instruction information, from the mode of sending 0.5-millisecond-TTI uplink information to the mode of sending 1-millisecond-TTI uplink information; and sending, by the terminal device, a PUSCH at a 1-millisecond TTI.

In a third possible implementation of the second aspect, the method further includes:

receiving, by the terminal device, at least one piece of second resource indication information, where the second resource indication information is used to indicate an uplink frequency domain resource for a PUSCH at a 0.5-millisecond TTI; and sending, by the terminal device, the PUSCH at the 0.5-millisecond TTI according to the second resource indication information, and sending an SRS, where the uplink frequency domain resource for the PUSCH sent at the 0.5-millisecond TTI includes at least one same PRB index or includes at least one same RBG index as an uplink frequency domain resource on which the SRS is located, the preset time interval is less than or equal to m*0.5 milliseconds, and m is a non-zero integer.

In a fourth possible implementation of the second aspect, the method further includes:

receiving, by the terminal device, random access procedure indication information sent by using a PDCCH; and sending, by the terminal device, an uplink channel in the random access procedure according to the random access procedure indication information, where the uplink channel includes a PRACH and/or a PUSCH.

In a fifth possible implementation of the second aspect, the method further includes:

detecting, by the terminal device, whether the terminal device reaches a second estimation threshold, where the second estimation threshold includes: one or more of the following parameters reach a specified threshold: a moving speed of the terminal device, a difference between an expected MCS index value and an MCS index received by the terminal device, or a difference between an MCS index received by the terminal device and an MCS index corresponding to a channel quality indicator CQI reported by the terminal device; and after detecting that the terminal device reaches the second estimation threshold, sending, by the terminal device, an uplink channel in a random access procedure, where the uplink channel includes a PRACH and/or a PUSCH.

According to a third aspect, an embodiment of the present disclosure provides a base station, including:

a selection module, configured to select a first modulation and coding scheme MCS index for a terminal device according to channel quality of the terminal device and/or a received target block error rate BLER of a physical uplink shared channel PUSCH of the terminal device;

a first determining module, configured to determine a reduced second MCS index according to an MCS index reduction value and the first MCS index, where the MCS index reduction value is used to perform reduction processing on the first MCS index to obtain the second MCS index;

a first sending module, configured to send the second MCS index to the terminal device;

a calibration module, configured to perform frequency offset calibration on a frequency of the terminal device according to a historical frequency offset value of the terminal device, where the historical frequency offset value is a stored frequency offset value of the terminal device; and a first receiving module, configured to: receive uplink information sent by the terminal device according to the second MCS index, and demodulate the PUSCH according to a frequency obtained after the frequency offset calibration.

In a first possible implementation of the third aspect, the apparatus further includes:

the first determining module is further configured to: after the terminal device performs 1-millisecond-TTI uplink information transmission, determine a frequency offset value of the terminal device according to DM-RSs on a PUSCH that is at a 1-millisecond TTI and sent by the terminal device; and the first determining module is further configured to determine the historical frequency offset value of the terminal device according to the frequency offset value of the terminal device.

In a second possible implementation of the third aspect, the apparatus further includes:

the first sending module is further configured to: after it is detected that the terminal device reaches a first estimation threshold, send at least one piece of first resource indication information to the terminal device, where the first resource indication information is used to indicate uplink frequency domain resources for PUSCHs at two 0.5-millisecond TTIs, and that it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of hybrid automatic repeat request HARQ retransmission times of a PUSCH of the terminal device, an error rate or a quantity of errors of a Media Access Control MAC packet/Radio Link Control RLC packet/Transmission Control Protocol TCP packet/Internet Protocol IP packet of the terminal device, a quantity of automatic repeat requests ARQs of a MAC packet of the terminal device, or quality of service QoS of a service corresponding to the terminal device;

the first receiving module is further configured to receive the PUSCHs that are at the two 0.5-millisecond TTIs and sent by the terminal device, where the uplink frequency domain resources for the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer;

the first determining module is further configured to determine a frequency offset value of the terminal device according to two DM-RSs on the PUSCHs at the two 0.5-millisecond TTIs or according to two DM-RSs in frequency domains with a same PRB index or a same RBG index on the PUSCHs at the two 0.5-millisecond TTIs; and the first determining module is further configured to determine the historical frequency offset value of the terminal device according to the frequency offset value of the terminal device.

In a third possible implementation of the third aspect, the apparatus further includes:

the first sending module is further configured to: after it is detected that the terminal device reaches a first estimation threshold, send mode instruction information to the terminal device, where the mode instruction information is used to instruct the terminal device to change from a mode of sending 0.5-millisecond-TTI uplink information to a mode of sending 1-millisecond-TTI uplink information, where that it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

the first receiving module is further configured to receive a PUSCH that is at a 1-millisecond TTI and sent by the terminal device;

the first determining module is further configured to determine a frequency offset value of the terminal device according to DM-RSs on the PUSCH that is at the 1-millisecond TTI and sent by the terminal device; and the first determining module is further configured to determine the historical frequency offset value of the terminal device according to the frequency offset value of the terminal device.

In a fourth possible implementation of the third aspect, the apparatus further includes:

the first sending module is further configured to: after it is detected that the terminal device reaches a first estimation threshold, send at least one piece of second resource indication information to the terminal device within a preset time interval contiguous to a moment at which the terminal device sends a sounding reference signal SRS, where the second resource indication information is used to indicate an uplink frequency domain resource for a PUSCH at a 0.5-millisecond TTI, and that it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

the first receiving module is further configured to: receive the PUSCH that is at the 0.5-millisecond TTI and sent by the terminal device, and receive the SRS sent by the terminal device, where the uplink frequency domain resource for the PUSCH sent at the 0.5-millisecond TTI includes at least one same frequency domain resource as an uplink frequency domain resource on which the SRS is located, the preset time interval is less than or equal to m*0.5 milliseconds, and m is a non-zero integer;

the first determining module is further configured to determine a frequency offset value of the terminal device according to the SRS and a DM-RS on the PUSCH at the 0.5-millisecond TTI or according to a DM-RS and an SRS that are on the same frequency domain resource in the SRS as on the PUSCH at the 0.5-millisecond TTI; and the first determining module is further configured to determine the historical frequency offset value of the terminal device according to the frequency offset value of the terminal device.

In a fifth possible implementation of the third aspect, the apparatus further includes:

the first sending module is further configured to: after it is detected that the terminal device reaches a first estimation threshold, send random access procedure indication information to the terminal device by using a physical downlink control channel PDCCH. where that it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

the first receiving module is further configured to receive an uplink channel that is in the random access procedure and sent by the terminal device according to the random access procedure indication information:

the first determining module is further configured to determine a frequency offset value of the terminal device according to a DM-RS and/or a preamble sequence on the uplink channel that is in the random access procedure and sent by the terminal device, where the uplink channel includes a physical random access channel PRACH and/or a PUSCH; and the first determining module is further configured to determine the historical frequency offset value of the terminal device according to the frequency offset value of the terminal device.

In a sixth possible implementation of the third aspect, the apparatus further includes:

the first receiving module is further configured to receive an uplink channel that is in a random access procedure and sent by the terminal device after the terminal device detects that the terminal device reaches a second estimation threshold, where the uplink channel includes a PRACH and/or a PUSCH, and the second estimation threshold includes: one or more of the following parameters reach a specified threshold: a moving speed of the terminal device, a difference between an expected MCS index value and an MCS index received by the terminal device, or a difference between an MCS index received by the terminal device and an MCS index corresponding to a channel quality indicator CQI reported by the terminal device;

the first determining module is further configured to determine a frequency offset value of the terminal device according to the uplink channel in the random access procedure triggered by the terminal device after the terminal device detects that the terminal device reaches the second estimation threshold, where the uplink channel includes the PRACH and/or the PUSCH; and the first determining module is further configured to determine the historical frequency offset value of the terminal device according to the frequency offset value of the terminal device.

According to a fourth aspect, an embodiment of the present disclosure provides a terminal device, including:

a second receiving module, configured to receive a second modulation and coding scheme MCS index, where the second MCS index is obtained after a base station performs reduction processing on a first MCS index according to an MCS index reduction value, and the first MCS index is selected by the base station according to channel quality of the terminal device and/or a received target block error rate BLER of a physical uplink shared channel PUSCH of the terminal device: and a second sending module, configured to send uplink information according to the second MCS index.

In a first possible implementation of the fourth aspect, the apparatus further includes:

the second receiving module is further configured to receive at least one piece of first resource indication information, where the first resource indication information is used to indicate uplink frequency domain resources for PUSCHs at two 0.5-millisecond TTIs, the uplink frequency domain resources for sending the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer; and the second sending module is further configured to send the PUSCHs at the two 0.5-millisecond TTIs according to the first resource indication information.

In a second possible implementation of the fourth aspect, the apparatus further includes a change module, where the second receiving module is further configured to receive mode instruction information, where the mode instruction information is used to instruct the terminal device to change from a mode of sending 0.5-millisecond-TTI uplink information to a mode of sending 1-millisecond-TTI uplink information;

the change module is configured to change, according to the mode instruction information, from the mode of sending 0.5-millisecond-TTI uplink information to the mode of sending 1-millisecond-TTI uplink information; and the second sending module is further configured to send a PUSCH at a 1-millisecond TTI.

In a third possible implementation of the fourth aspect, the apparatus further includes:

the second receiving module is further configured to receive at least one piece of second resource indication information, where the second resource indication information is used to indicate an uplink frequency domain resource for a PUSCH at a 0.5-millisecond TTI; and the second sending module is further configured to: send the PUSCH at the 0.5-millisecond TI according to the second resource indication information, and send an SRS, where the uplink frequency domain resource for the PUSCH sent at the 0.5-millisecond TTI includes at least one same PRB index or includes at least one same RBG index as an uplink frequency domain resource on which the SRS is located, the preset time interval is less than or equal to m*0.5 milliseconds, and m is a non-zero integer.

In a fourth possible implementation of the fourth aspect, the apparatus further includes:

the second receiving module is further configured to receive random access procedure indication information sent by using a PDCCH; and the second sending module is further configured to send an uplink channel in the random access procedure according to the random access procedure indication information, where the uplink channel includes a PRACH and/or a PUSCH.

In a fifth possible implementation of the fourth aspect, the apparatus further includes a detection module, where the detection module is configured to detect whether the terminal device reaches a second estimation threshold, where the second estimation threshold includes: one or more of the following parameters reach a specified threshold: a moving speed of the terminal device, a difference between an expected MCS index value and an MCS index received by the terminal device, or a difference between an MCS index received by the terminal device and an MCS index corresponding to a channel quality indicator CQI reported by the terminal device; and the second sending module is further configured to: after it is detected that the terminal device reaches the second estimation threshold, send an uplink channel in a random access procedure, where the uplink channel includes a PRACH and/or a PUSCH.

According to a fifth aspect, an embodiment of the present disclosure provides a base station, where the base station includes:

a processor, a transmitter, and a receiver, where the processor is configured to: select a first modulation and coding scheme MCS index for a terminal device according to channel quality of the terminal device and/or a received target block error rate BLER of a physical uplink shared channel PUSCH of the terminal device; determine a second MCS index according to an MCS index reduction value and the first MCS index, where the MCS index reduction value is used to perform reduction processing on the first MCS index to obtain the second MCS index: perform frequency offset calibration on a frequency of the terminal device according to a historical frequency offset value of the terminal device, where the historical frequency offset value is a frequency offset value of the terminal device that is stored in the base station; and demodulate the PUSCH according to a frequency obtained after the frequency offset calibration;

the transmitter is configured to send the second MCS index to the terminal device; and the receiver is configured to receive uplink information sent by the terminal device according to the second MCS index.

In a first possible implementation of the fifth aspect, the processor is further configured to: after the terminal device performs 1-millisecond-TTI uplink information transmission, determine a frequency offset value of the terminal device according to DM-RSs on a PUSCH that is at a 1-millisecond TI and sent by the terminal device; and determine the historical frequency offset value of the terminal device according to the frequency offset value of the terminal device.

In a second possible implementation of the fifth aspect, the transmitter is further configured to: after it is detected that the terminal device reaches a first estimation threshold, send at least one piece of first resource indication information to the terminal device, where the first resource indication information is used to indicate uplink frequency domain resources for PUSCHs at two 0.5-millisecond TTIs, and that it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of hybrid automatic repeat request HARQ retransmission times of a PUSCH of the terminal device, an error rate or a quantity of errors of a Media Access Control MAC packet/ Radio Link Control RLC packet/Transmission Control Protocol TCP packet/Internet Protocol IP packet of the terminal device, a quantity of automatic repeat requests ARQs of a MAC packet of the terminal device, or quality of service QoS of a service corresponding to the terminal device;

the receiver is further configured to receive the PUSCHs that are at the two 0.5-millisecond TTIs and sent by the terminal device, where the uplink frequency domain resources for the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer; and the processor is further configured to: determine a frequency offset value of the terminal device according to two DM-RSs on the PUSCHs at the two 0.5-millisecond TTIs or according to two DM-RSs in frequency domains with a same PRB index or a same RBG index on the PUSCHs at the two 0.5-millisecond TTIs: and determine the historical frequency offset value of the terminal device according to the frequency offset value of the terminal device.

In a third possible implementation of the fifth aspect, the transmitter is further configured to: after it is detected that the terminal device reaches a first estimation threshold, send mode instruction information to the terminal device, where the mode instruction information is used to instruct the terminal device to change from a mode of sending 0.5-millisecond-TTI uplink information to a mode of sending 1-millisecond-TTI uplink information, and that it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/ TCP packet/IP packet of the terminal device, a quantity of ARQs of a MAC packet of the terminal device, or QoS of a service corresponding to the terminal device;

the receiver is further configured to receive a PUSCH that is at a 1-millisecond TTI and sent by the terminal device; and the processor is further configured to: determine a frequency offset value of the terminal device according to DM-RSs on the PUSCH that is at the 1-millisecond TTI and sent by the terminal device; and determine the historical frequency offset value of the terminal device according to the frequency offset value of the terminal device.

In a fourth possible implementation of the fifth aspect, the transmitter is further configured to: after it is detected that the terminal device reaches a first estimation threshold, send at least one piece of second resource indication information to the terminal device within a preset time interval contiguous to a moment at which the terminal device sends a sounding reference signal SRS, where the second resource indication information is used to indicate an uplink frequency domain resource for a PUSCH at a 0.5-millisecond TTI. and that it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device:

the receiver is further configured to: receive the PUSCH that is at the 0.5-millisecond TTI and sent by the terminal device, and receive the SRS sent by the terminal device, where the uplink frequency domain resource for the PUSCH sent at the 0.5-millisecond TTI includes at least one same frequency domain resource as an uplink frequency domain resource on which the SRS is located, the preset time interval is less than or equal to m*0.5 milliseconds, and m is a non-zero integer; and the processor is further configured to: determine a frequency offset value of the terminal device according to the SRS and a DM-RS on the PUSCH at the 0.5-millisecond TTI or according to a DM-RS and an SRS that are on the same frequency domain resource in the SRS as on the PUSCH at the 0.5-millisecond TTI; and determine the historical frequency offset value of the terminal device according to the frequency offset value of the terminal device.

In a fifth possible implementation of the fifth aspect, the transmitter is further configured to: after it is detected that the terminal device reaches a first estimation threshold, send random access procedure indication information to the terminal device by using a physical downlink control channel PDCCH, where that it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/

IP packet of the terminal device, a quantity of ARQs of a MAC packet of the terminal device, or QoS of a service corresponding to the terminal device:

the receiver is further configured to receive an uplink channel that is in the random access procedure and sent by the terminal device according to the random access procedure indication information; and the processor is further configured to: determine a frequency offset value of the terminal device according to a DM-RS and/or a preamble sequence on the uplink channel that is in the random access procedure and sent by the terminal device, where the uplink channel includes a physical random access channel PRACH and/or a PUSCH; and determine the historical frequency offset value of the terminal device according to the frequency offset value of the terminal device.

In a sixth possible implementation of the fifth aspect, the receiver is further configured to receive an uplink channel that is in a random access procedure and sent by the terminal device after the terminal device detects that the terminal device reaches a second estimation threshold, where the uplink channel includes a PRACH and/or a PUSCH, and the second estimation threshold includes: one or more of the following parameters reach a specified threshold: a moving speed of the terminal device, a difference between an expected MCS index value and an MCS index received by the terminal device, or a difference between an MCS index received by the terminal device and an MCS index corresponding to a channel quality indicator CQI reported by the terminal device; and the processor is further configured to: determine a frequency offset value of the terminal device according to the uplink channel in the random access procedure triggered by the terminal device after the terminal device detects that the terminal device reaches the second estimation threshold, where the uplink channel includes the PRACH and/or the PUSCH; and determine the historical frequency offset value of the terminal device according to the frequency offset value of the terminal device.

According to a sixth aspect, an embodiment of the present disclosure provides a terminal device, where the terminal device includes:

a transmitter and a receiver, where the receiver is configured to receive a second modulation and coding scheme MCS index, where the second MCS index is obtained after a base station performs reduction processing on a first MCS index according to an MCS index reduction value, and the first MCS index is selected by the base station according to channel quality of the terminal device and/or a received target block error rate BLER of a physical uplink shared channel PUSCH of the terminal device; and the transmitter is configured to send uplink information according to the second MCS index.

In a first possible implementation of the sixth aspect, the receiver is further configured to receive at least one piece of first resource indication information, where the first resource indication information is used to indicate uplink frequency domain resources for PUSCHs at two 0.5-millisecond TTIs, the uplink frequency domain resources for sending the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer; and the transmitter is further configured to send the PUSCHs at the two 0.5-millisecond TTIs according to the first resource indication information.

In a second possible implementation of the sixth aspect, the terminal device further includes a processor, where the receiver is further configured to receive mode instruction information, where the mode instruction information is used to instruct the terminal device to change from a mode of sending 0.5-millisecond-TTI uplink information to a mode of sending 1-millisecond-TTI uplink information:

the processor is configured to change, according to the mode instruction information, from the mode of sending 0.5-millisecond-TTI uplink information to the mode of sending 1-millisecond-TTI uplink information; and the transmitter is further configured to send a PUSCH at a 1-millisecond TTI.

In a third possible implementation of the sixth aspect, the receiver is further configured to receive at least one piece of second resource indication information, where the second resource indication information is used to indicate an uplink frequency domain resource for a PUSCH at a 0.5-millisecond TTI; and the transmitter is further configured to: send the PUSCH at the 0.5-millisecond TTI according to the second resource indication information, and send an SRS, where the uplink frequency domain resource for the PUSCH sent at the 0.5-millisecond TTI includes at least one same PRB index or includes at least one same RBG index as an uplink frequency domain resource on which the SRS is located, the preset time interval is less than or equal to m*0.5 milliseconds, and m is a non-zero integer.

In a fourth possible implementation of the sixth aspect, the receiver is further configured to receive random access procedure indication information sent by using a PDCCH; and the transmitter is further configured to send an uplink channel in the random access procedure according to the random access procedure indication information, where the uplink channel includes a PRACH and/or a PUSCH.

In a fifth possible implementation of the sixth aspect, the terminal device further includes a processor, where the processor is configured to detect whether the terminal device reaches a second estimation threshold, where the second estimation threshold includes: one or more of the following parameters reach a specified threshold: a moving speed, a difference between an expected MCS index value and a received MCS index, or a difference between an MCS index received by the terminal device and an MCS index corresponding to a channel quality indicator CQI reported by the terminal device; and the transmitter is further configured to: after it is detected that the terminal device reaches the second estimation threshold, send an uplink channel in a random access procedure, where the uplink channel includes a PRACH and/or a PUSCH.

According to a seventh aspect, an embodiment of the present disclosure provides an uplink information demodulation system, where the system includes a base station and a terminal device, where the base station includes:

a selection module, configured to select a first modulation and coding scheme MCS index for the terminal device according to channel quality of the terminal device and/or a received target block error rate BLER of a physical uplink shared channel PUSCH of the terminal device;

a first determining module, configured to determine a second MCS index according to an MCS index reduction value and the first MCS index, where the MCS index reduction value is used to perform reduction processing on the first MCS index to obtain the second MCS index;

a first sending module, configured to send the second MCS index to the terminal device;

a calibration module, configured to perform frequency offset calibration on a frequency of the terminal device according to a historical frequency offset value of the terminal device, where the historical frequency offset value is a stored frequency offset value of the terminal device; and a first receiving module, configured to: receive uplink information sent by the terminal device according to the second MCS index, and demodulate the PUSCH according to a frequency obtained after the frequency offset calibration; and the terminal device includes:

a second receiving module, configured to receive the second MCS index, where the second MCS index is obtained after the base station performs reduction processing on the first MCS index according to the MCS index reduction value, and the first MCS index is selected by the base station according to the channel quality of the terminal device and/or the received target block error rate BLER of the PUSCH of the terminal device; and a second sending module, configured to send the uplink information according to the second MCS index.

According to the technical solutions provided in the embodiments of the present disclosure, after the MCS index is selected for the terminal device, reduction processing is performed on the MCS index according to a preset MCS index reduction exponent, a reduced MCS index is indicated to the terminal device, frequency offset estimation is performed on the terminal device by using the recorded historical frequency offset value, and the PUSCH sent by the terminal device according to the reduced MCS index is demodulated after the frequency offset estimation. The frequency offset value is determined by using the prerecorded historical frequency offset value, so that the frequency offset value does not need to be determined in an existing manner of adding a DM-RS symbol to a 0.5-millisecond TTI. Therefore, fewer resources are occupied, data transmission efficiency is improved, and reference signal system overheads are reduced.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

It should be noted that the technical solutions in the embodiments of the present disclosure may be applied to various communications systems such as a GSM (Global System for Mobile Communications), a CDMA (Code Division Multiple Access) system, a WCDMA (Wideband Code Division Multiple Access) system, a GPRS (general packet radio service), and LTE (Long Term Evolution).

A terminal device that may also be referred to as a mobile terminal, user equipment, a mobile terminal device, or the like may communicate with one or more core networks by using a radio access network (for example, a RAN (Radio Access Network)). The terminal device may be a mobile terminal such as a mobile phone (or referred to as a "cellular" phone) and a computer with a mobile terminal. For example, the terminal device may be a portable, pocket-sized, handheld, computer built-in, or in-vehicle mobile apparatus that exchanges voice and/or data with the radio access network.

A base station may be a base transceiver station (BTS) in the GSM or the CDMA, may be a NodeB in the WCDMA, or may be an evolved NodeB (eNB or e-NodeB, evolutional Node B) in the LTE. This is not limited in the embodiments of the present disclosure.

Embodiment 1

Figure 1:
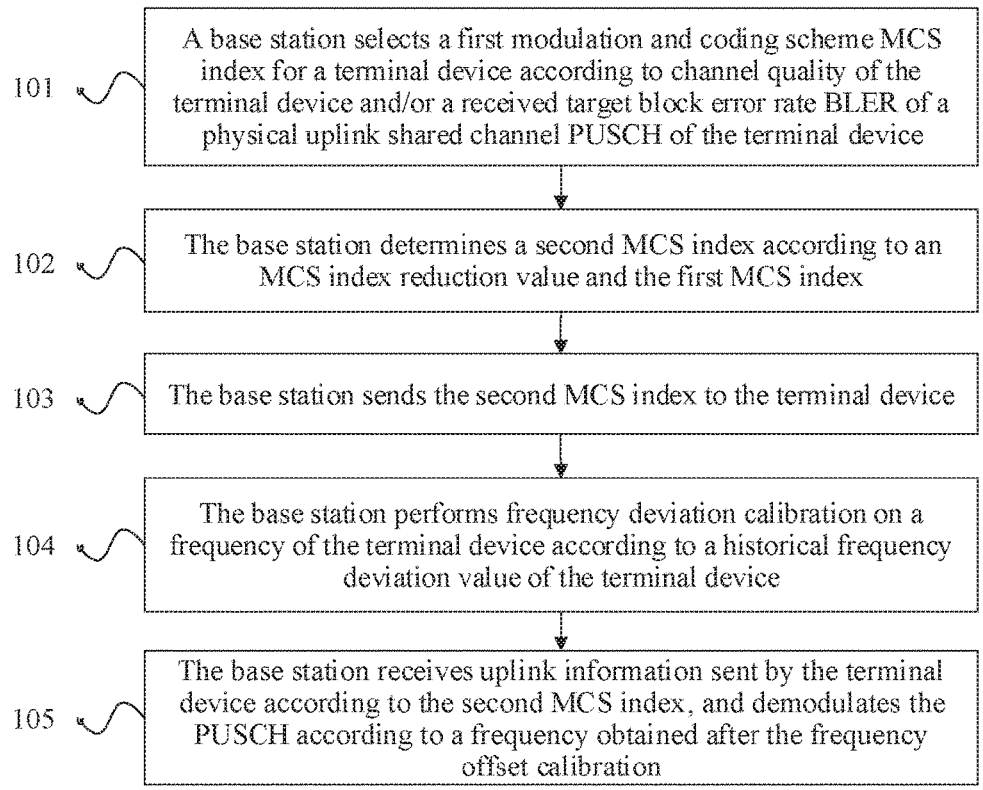
FIG. 1 is a flowchart of an uplink information demodulation method according to Embodiment 1 of the present disclosure.

Referring to FIG. 1, this embodiment of the present disclosure provides an uplink information demodulation method.

The method includes the following steps.

101. A base station selects a first modulation and coding scheme MCS index for a terminal device according to channel quality of the terminal device and/or a received target block error rate BLER of a physical uplink shared channel PUSCH of the terminal device.

102. The base station determines a second MCS index according to an MCS index reduction value and the first MCS index, where the MCS index reduction value is used to perform reduction processing on the first MCS index to obtain the second MCS index.

Uplink information may include a reference signal, a sounding signal, and a physical channel.

In this embodiment of the present disclosure, real-time frequency offset estimation is not performed on the uplink information of the terminal device. Therefore, due to impact of a factor such as a current moving speed and channel quality of the terminal device, frequency offset calibration performed by the eNodeB on a frequency of the terminal device according to a prerecorded historical frequency offset value of the terminal device may be inaccurate, and accordingly, demodulation of the PUSCH of the terminal device is inaccurate.

Therefore, in this embodiment of the present disclosure, the MCS (modulation and coding scheme) index reduction value is preset in the eNodeB, and subtraction processing is performed, by using the MCS index reduction value, on the MCS index determined according to the channel quality of the terminal device and/or the received BLER (Block Error Rate, target block error rate) of the PUSCH (physical uplink shared channel) of the terminal device, so as to reduce a value of an MCS index sent to the terminal device. That is, the MCS index=n, the preset MCS index reduction value=x, and the second MCS index=n−x.

It should be noted that the MCS index determined by the base station according to the channel quality of the terminal device may include but is not limited to: an MCS index determined by the base station according to a CQI (channel quality indicator) reported by the terminal device, an MCS index determined by the base station according to RSRP (reference signal received power) reported by the terminal device, an MCS index determined by the base station according to RSRQ (reference signal received quality) reported by the terminal device, an MCS index determined by the base station according to an SRS (sounding reference signal) reported by the terminal device, or an MCS index determined by the base station in another manner that may represent the channel quality of the terminal device. This is not limited herein.

A manner of sending the second MCS index to the terminal device may include but is not limited to a PDCCH (physical downlink control channel) or an EPDCCH (enhanced physical downlink control channel).

103. The base station sends the second MCS index to the terminal device.

104. The base station performs frequency offset calibration on a frequency of the terminal device according to a historical frequency offset value of the terminal device, where the historical frequency offset value is a frequency offset value of the terminal device that is stored in the base station.

The eNodeB records a historical frequency offset value of each terminal device. The eNodeB may obtain the historical frequency offset value of each terminal device in the following manners:

The eNodeB obtains the historical frequency offset value in a random access procedure performed by the terminal device, or obtains the historical frequency offset value from uplink information at a 1-millisecond transmission time interval that is sent by the terminal device.

Alternatively, after performing specified-manner scheduling, configuration, or indication after the eNodeB detects that the terminal device reaches a first estimation threshold, the eNodeB obtains the historical frequency offset value by using uplink information sent by the terminal device.

Alternatively, the eNodeB obtains the historical frequency offset value according to an uplink channel that is in a random access procedure and sent by the terminal device after the terminal device detects that the terminal device reaches a second estimation threshold.

105. The base station receives uplink information sent by the terminal device according to the second MCS index, and demodulates the PUSCH according to a frequency obtained after the frequency offset calibration.

According to this embodiment of the present disclosure, after the MCS index is selected for the terminal device, reduction processing is performed on the MCS index according to a preset MCS index reduction exponent, a reduced MCS index is indicated to the terminal device, frequency offset estimation is performed on the terminal device by using the recorded historical frequency offset value, and the PUSCH sent by the terminal device according to the reduced MCS index is demodulated after the frequency offset estimation. Frequency calibration is performed by using the prerecorded historical frequency offset value, so that the frequency offset value does not need to be determined in an existing manner of adding a DM-RS symbol to each 0.5-millisecond TTI. Therefore, fewer reference signal resources are occupied, data transmission efficiency is improved, and reference signal system overheads are reduced.

Embodiment 2

Figure 2:
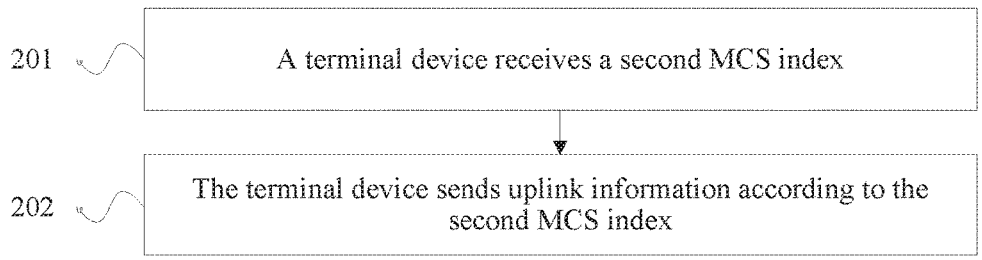
FIG. 2 is a flowchart of an uplink information demodulation method according to Embodiment 2 of the present disclosure.

Referring to FIG. 2, this embodiment of the present disclosure provides an uplink information demodulation method.

The method includes the following steps:

201. A terminal device receives a second MCS index, where the second MCS index is obtained after a base station performs reduction processing on a first MCS index according to an MCS index reduction value, and the first MCS index is selected by the base station according to channel quality of the terminal device and/or a received target block error rate BLER of a physical uplink shared channel PUSCH of the terminal device.

202. The terminal device sends uplink information according to the second MCS index.

The uplink information may include a reference signal, a sounding signal, and a physical channel.

According to this embodiment of the present disclosure, the terminal device sends the uplink information according to a reduced MCS index, so as to reduce a rate at which the terminal device sends the uplink information to the base station. In this way, when frequency calibration performed by the base station by using a historical frequency offset value is inaccurate, reliability of the uplink information is improved, and an accuracy rate of the uplink information sent by the terminal device is accordingly improved.

Embodiment 3

Figure 3:
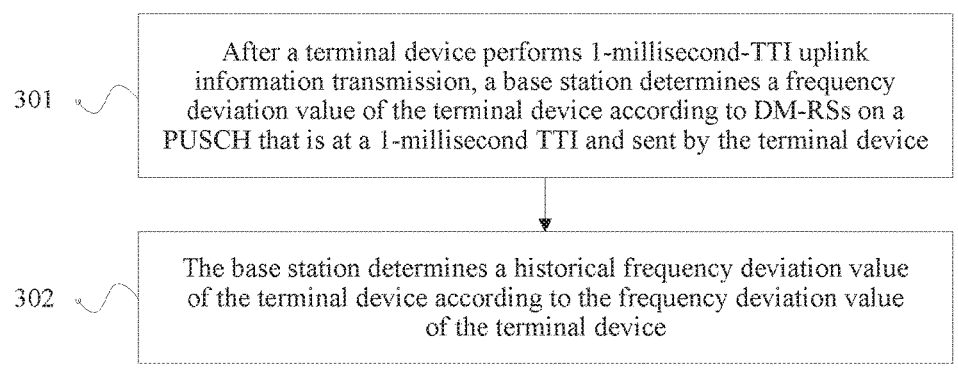
FIG. 3 is a flowchart of an uplink information demodulation method according to Embodiment 3 of the present disclosure.

Referring to FIG. 3, this embodiment of the present disclosure provides a method for determining a historical frequency offset value of a terminal device in an uplink information demodulation method. The method includes the following steps.

301. After a terminal device performs 1-millisecond-TTI uplink information transmission, a base station determines a frequency offset value of the terminal device according to DM-RSs on a PUSCH that is at a 1-millisecond TTI and sent by the terminal device.

A manner of triggering the terminal device to perform 1-millisecond-TTI uplink information transmission is not limited.

When the terminal device performs 1-millisecond-TTI uplink information transmission, the eNodeB may determine the frequency offset value by using a phase difference between the two DM-RSs on the PUSCH sent by the terminal device at the 1-millisecond TTI.

302. The base station determines a historical frequency offset value of the terminal device according to the frequency offset value of the terminal device.

In this embodiment, the PUSCH is a physical channel used to carry uplink data of the terminal device, and may also be used to transmit UCI (uplink control information) of the terminal device.

A manner in which the base station determines the historical frequency offset value of the terminal device may include but is not limited to the following manner: The base station obtains, by means of calculation, the frequency offset value by using the phase difference between the two DM-RSs, and stores the frequency offset value or replaces the historical frequency offset value of the terminal device.

According to this embodiment of the present disclosure, the terminal device performs 1-millisecond-TTI uplink information transmission, and the historical frequency offset value of the terminal device is determined based on the DM-RSs on the PUSCH at the 1-millisecond TTI. The frequency offset value does not need to be determined in an existing manner of adding a DM-RS symbol to each 0.5-millisecond TTI. Therefore, fewer reference signal resources are occupied, data transmission efficiency is improved, and reference signal system overheads are reduced.

Figure 4:
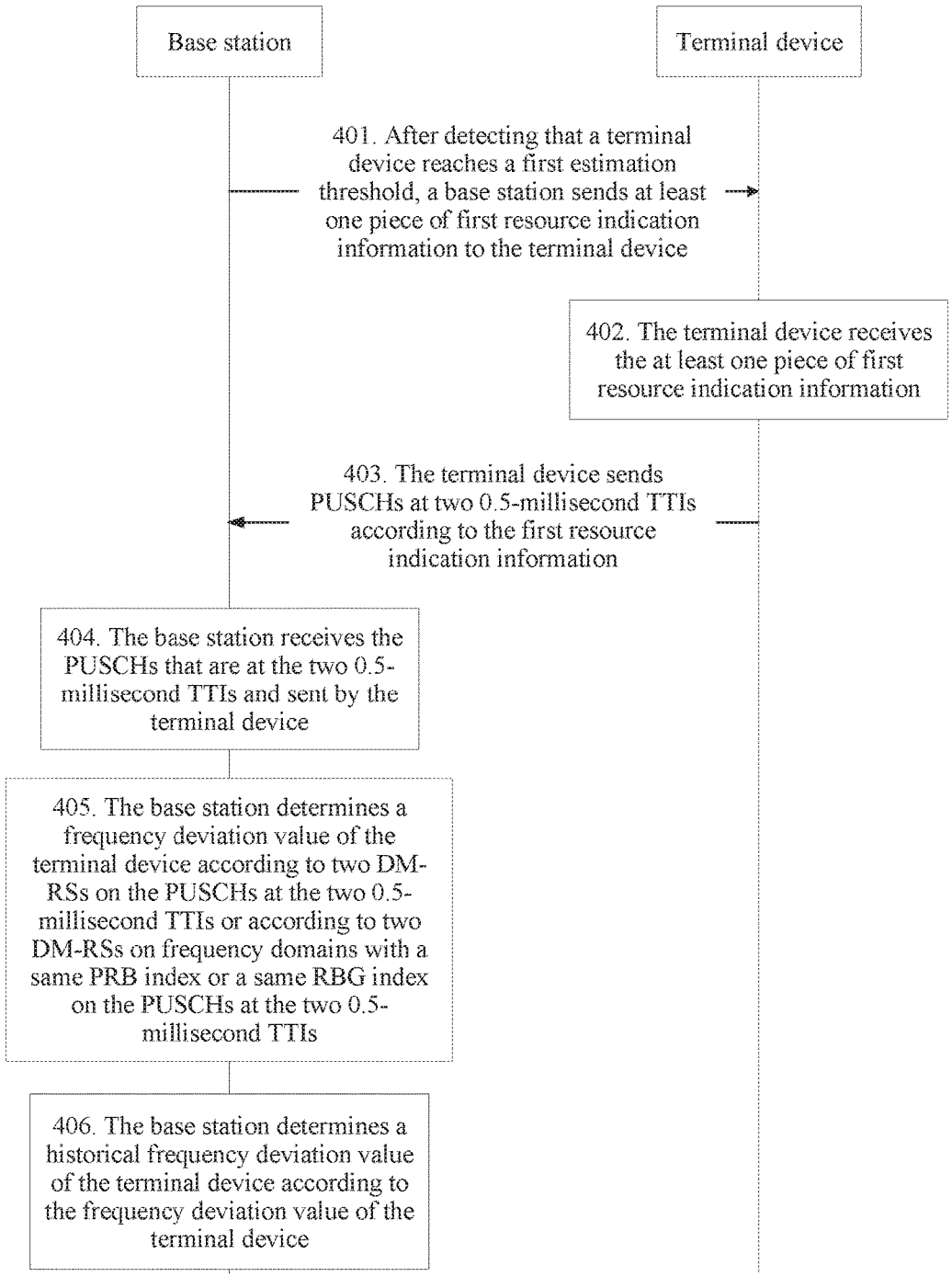
FIG. 4 is a flowchart of an uplink information demodulation method according to Embodiment 3 of the present disclosure.

Referring to FIG. 4, this embodiment of the present disclosure provides a method for determining a historical frequency offset value of a terminal device in another uplink information demodulation method. The method includes the following steps.

401. After detecting that a terminal device reaches a first estimation threshold, a base station sends at least one piece of first resource indication information to the terminal device, where the first resource indication information is used to indicate uplink frequency domain resources for PUSCHs at two 0.5-millisecond TTIs.

That a base station detects that a terminal device reaches a first estimation threshold includes: one or more of the following parameters reach a specified threshold: a moving speed of the terminal device, a mean MCS change value of the terminal device, an MCS variance of the terminal device, a received BLER of a PUSCH of the terminal device, a quantity of HARQ (hybrid automatic repeat request) retransmission times of a PUSCH of the terminal device, an error rate or a quantity of errors of a MAC (Media Access Control) packet/RLC (Radio Link Control) packet/TCP (Transmission Control Protocol) packet/IP (Internet Protocol) packet of the terminal device, a quantity of ARQs (automatic repeat request) of a MAC packet of the terminal device, or QoS (quality of service) of a service corresponding to the terminal device.

At least one piece of resource indication information sent by the eNodeB to the terminal device may be specifically DCI (downlink control information) or higher layer signaling. The higher layer signaling may include but is not limited to RNC (radio network controller) signaling, RRC (radio resource control) signaling, MAC signaling, or signaling carried in a broadcast message. In this manner, the eNodeB sends two pieces of DCI to the terminal device by using a PDCCH or an EPDCCH at different moments, and one piece of DCI indicates an uplink frequency domain resource for a PUSCH at one 0.5-millisecond TTI to the terminal device. Alternatively, the eNodeB sends one piece of DCI or at least one piece of higher layer signaling to the terminal device by using a PDCCH or an EPDCCH at a same moment, and the one piece of DCI or the at least one piece of higher layer signaling indicates uplink frequency domain resources for PUSCHs at two 0.5-millisecond TTIs to the terminal device. The uplink frequency domain resources of the terminal device for the PUSCHs at the two 0.5-millisecond TTIs need to have at least one same frequency domain resource.

402. The terminal device receives the at least one piece of first resource indication information, where the first resource indication information is used to indicate the uplink frequency domain resources for the PUSCHs at the two 0.5-millisecond TTIs.

The uplink frequency domain resources for sending the PUSCHs at the two 0.5-millisecond TTIs include at least one same physical resource block PRB (physical resource block) index or include at least one same resource block group RBG (resource block group) index, a time interval between the two 0.5-millisecond TTIs is less than or equal to n*0.5 milliseconds, and n is a non-zero positive integer.

403. The terminal device sends the PUSCHs at the two 0.5-millisecond TTIs according to the first resource indication information.

404. The base station receives the PUSCHs that are at the two 0.5-millisecond TTIs and sent by the terminal device, where the uplink frequency domain resources for the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer.

It should be noted that this embodiment is extensible: If a time interval at which the base station receives the PUSCHs that are at the two 0.5-millisecond TTIs and sent by the terminal device is greater than n*0.5 milliseconds, and n is a non-zero positive integer, the base station does not perform step 405 and step 406, that is, does not determine or update a frequency offset value of the terminal device.

405. The base station determines a frequency offset value of the terminal device according to two DM-RSs on the PUSCHs at the two 0.5-millisecond TTIs or according to two DM-RSs in frequency domains with a same PRB index or a same RBG index on the PUSCHs at the two 0.5-millisecond TTIs.

In this embodiment, the PUSCH is a physical channel used to carry uplink data of the terminal device, and may also be used to transmit UCI of the terminal device.

The eNodeB may determine the frequency offset value of the terminal device according to a phase difference between the two DM-RSs on the PUSCHs at the two 0.5-millisecond TTIs. and the PUSCH at each 0.5-millisecond TTI includes one DM-RS. Alternatively, the eNodeB may determine the frequency offset value according to a phase difference between the two DM-RSs in frequency domains with the same PRB index or RBG index on the PUSCHs at the two 0.5-millisecond TTIs.

Code sequences of the two DM-RSs in the frequency domains with the same PRB index or the same RBG index on the PUSCHs sent at the two 0.5-millisecond TTIs may not be entire code sequences of the DM-RSs, that is, are merely partial code sequences of the DM-RSs on the PUSCHs. The base station may determine the frequency offset value according to a phase difference between the partial code sequences of the two DM-RSs in the frequency domains with the same PRB index or the same RBG index. The code sequence may be any digital sequence, and is not limited herein, for example, a ZC (Zadoff-Chu) sequence.

406. The base station determines a historical frequency offset value of the terminal device according to the frequency offset value of the terminal device.

It should be noted that, as described in this embodiment, only when the two PUSCHs at the two 0.5-ms TTIs include same frequency domain resources, for example, the PRB indexes are the same or the RBG indexes are the same, the base station determines the frequency offset value according to the phase difference between the DM-RSs at the two 0.5-ms TTIs. It may be understood that, if the two PUSCHs at the two 0.5-ms TTIs include no same frequency domain resource, the base station does not determine the frequency offset value according to the phase difference between the DM-RSs at the two 0.5-ms TTIs.

According to this embodiment of the present disclosure, the terminal device is instructed to send the PUSCHs at the two 0.5-millisecond TTIs. and the base station determines the historical frequency offset value of the terminal device based on the two received DM-RSs on the PUSCHs sent at the two 0.5-millisecond TTIs. The frequency offset value does not need to be determined in an existing manner of adding a DM-RS symbol to each 0.5-millisecond TTI. Therefore, fewer reference signal resources are occupied, data transmission efficiency is improved, and reference signal system overheads are reduced.

Figure 5:
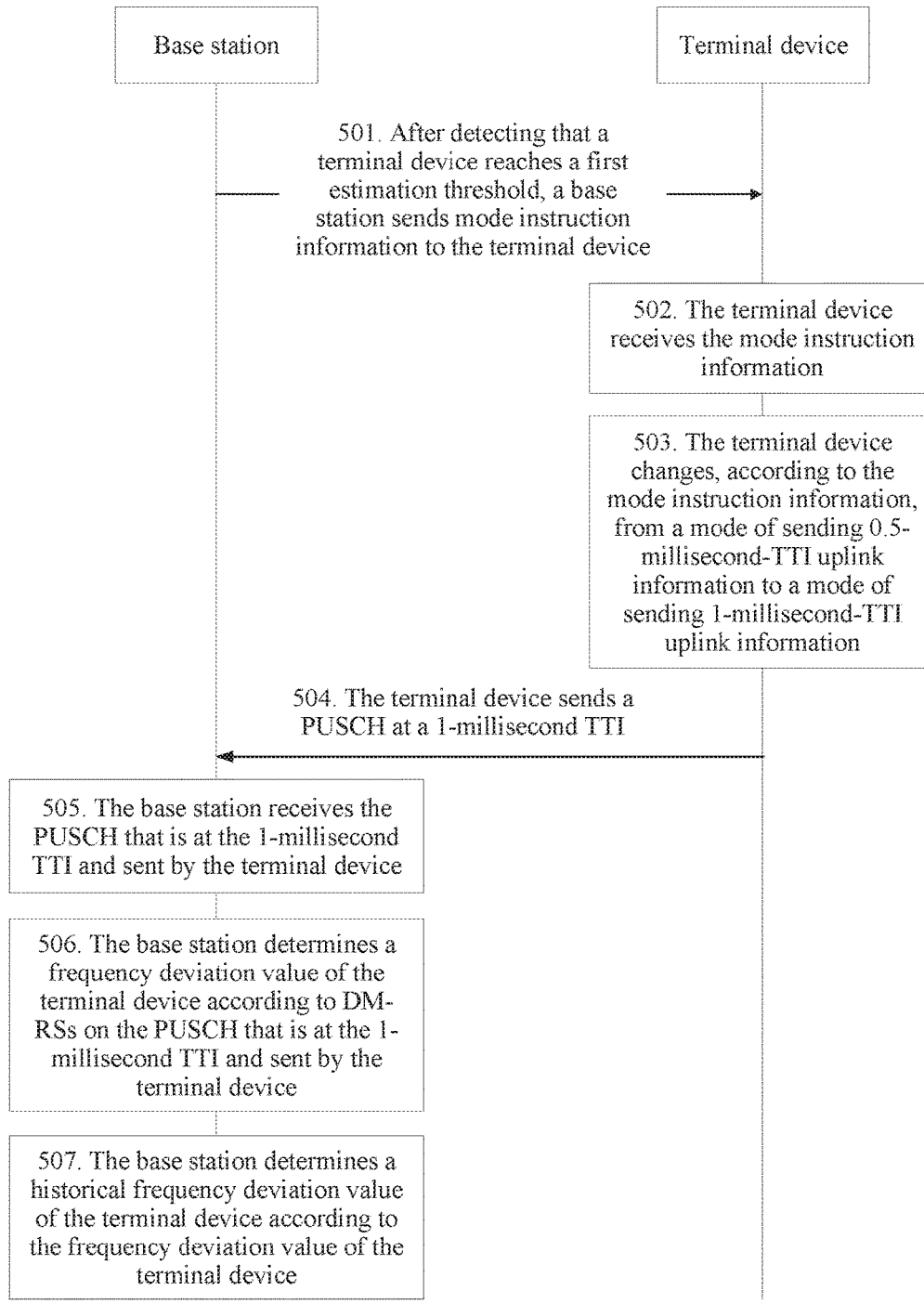
FIG. 5 is a flowchart of an uplink information demodulation method according to Embodiment 3 of the present disclosure.

Referring to FIG. 5, this embodiment of the present disclosure provides a method for determining a historical frequency offset value of a terminal device in another uplink information demodulation method. The method includes the following steps.

501. After detecting that a terminal device reaches a first estimation threshold, a base station sends mode instruction information to the terminal device, where the mode instruction information is used to instruct the terminal device to change from a mode of sending 0.5-millisecond-TTI uplink information to a mode of sending 1-millisecond-TTI uplink information.

The uplink information includes but is not limited to a PRACH (physical random access channel), a PUSCH, and a PUCCH (physical uplink control channel).

That a base station detects that a terminal device reaches a first estimation threshold includes: one or more of the following parameters reach a specified threshold: a moving speed of the terminal device, a mean MCS change value of the terminal device, an MCS variance of the terminal device, a received BLER of a PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device.

502. The terminal device receives the mode instruction information, where the mode instruction information is used to instruct the terminal device to change from the mode of sending 0.5-millisecond-TTI uplink information to the mode of sending 1-millisecond-TTI uplink information.

503. The terminal device changes, according to the mode instruction information, from the mode of sending 0.5-millisecond-TTI uplink information to the mode of sending 1-millisecond-TTI uplink information.

It should be noted that, that the terminal device changes, according to the mode instruction information, from the mode of sending 0.5-millisecond-TTI uplink information to the mode of sending 1-millisecond-TTI uplink information may be: after receiving the mode instruction information, the terminal device immediately changes to the mode of sending 1-millisecond-TTI uplink information; or may be: after X slots, the terminal device changes to the mode of sending 1-millisecond-TTI uplink information. X is a positive integer greater than or equal to 6.

504. The terminal device sends a PUSCH at a 1-millisecond TTI.

505. The base station receives the PUSCH that is at the 1-millisecond TTI and sent by the terminal device.

506. The base station determines a frequency offset value of the terminal device according to DM-RSs on the PUSCH that is at the 1-millisecond TTI and sent by the terminal device.

When the terminal device performs 1-millisecond-TTI uplink information transmission, the eNodeB may determine the frequency offset value by using a phase difference between the two DM-RSs on the PUSCH sent by the terminal device at the 1-millisecond TTI.

In this embodiment, the PUSCH is a physical channel used to carry uplink data of the terminal device, and may also be used to transmit UCI of the terminal device.

507. The base station determines a historical frequency offset value of the terminal device according to the frequency offset value of the terminal device.

According to this embodiment of the present disclosure, the terminal device is instructed to send the PUSCH at the 1-millisecond TTI, and the base station determines the historical frequency offset value of the terminal device based on the two received DM-RSs on the PUSCH at the 1-millisecond TTI. The frequency offset value does not need to be determined in an existing manner of adding a DM-RS symbol to each 0.5-millisecond TTI. Therefore, fewer reference signal resources are occupied, data transmission efficiency is improved, and reference signal system overheads are reduced.

Figure 6:
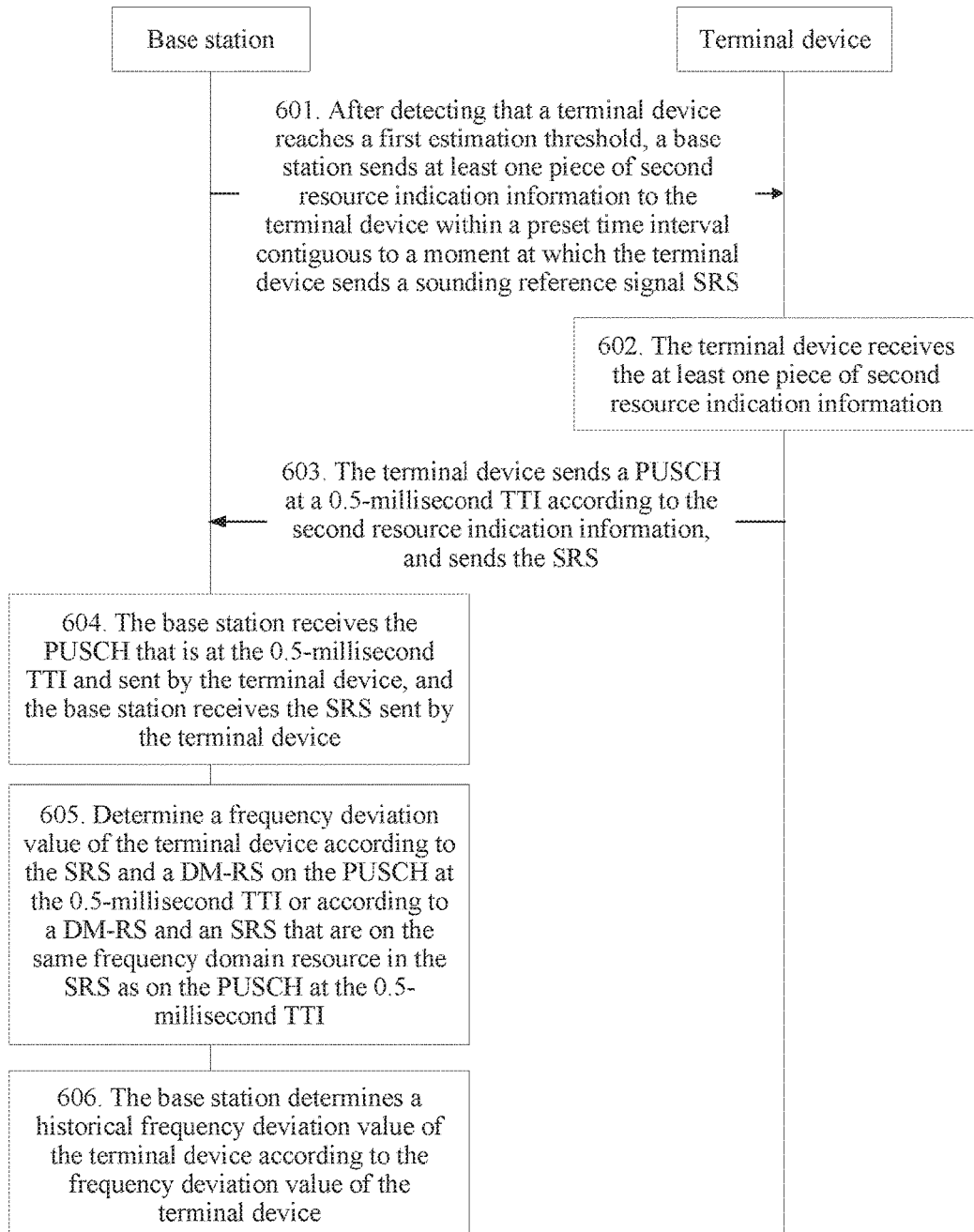
FIG. 6 is a flowchart of an uplink information demodulation method according to Embodiment 3 of the present disclosure.

Referring to FIG. 6, this embodiment of the present disclosure provides a method for determining a historical frequency offset value of a terminal device in another uplink information demodulation method. The method includes the following steps.

601. After detecting that a terminal device reaches a first estimation threshold, a base station sends at least one piece of second resource indication information to the terminal device within a preset time interval contiguous to a moment at which the terminal device sends a sounding reference signal SRS, where the second resource indication information is used to indicate an uplink frequency domain resource for a PUSCH at a 0.5-millisecond TTI.

The detecting that a terminal device reaches a first estimation threshold includes: one or more of the following parameters reach a specified threshold: a moving speed of the terminal device, a mean MCS change value of the terminal device, an MCS variance of the terminal device, a received BLER of a PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device.

In this manner, the eNodeB sends DCI to the terminal device by using a PDCCH or an EPDCCH, and indicates the uplink frequency domain resource for the PUSCH at the 0.5-millisecond TTI to the terminal device in the DCI. The uplink frequency domain resource of the terminal device for the PUSCH at the 0.5-millisecond TTI needs to have a same frequency domain resource as the SRS sent by the terminal device.

The eNodeB knows a sending time of a periodic or aperiodic SRS (sounding reference signal) of each terminal device. Therefore, within a preset time interval before or after the terminal device sends the SRS, the eNodeB may schedule the terminal device to send a PUSCH, so that an uplink frequency domain resource on which the terminal device sends the SRS has a same frequency domain resource as an uplink frequency domain resource on which the terminal device is scheduled to send the PUSCH, thereby determining a frequency offset value of the terminal device.

602. The terminal device receives the at least one piece of second resource indication information, where the second resource indication information is used to indicate the uplink frequency domain resource for the PUSCH at the 0.5-millisecond TTI.

603. The terminal device sends the PUSCH at the 0.5-millisecond TTI according to the second resource indication information, and sends the SRS.

The uplink frequency domain resource for the PUSCH sent at the 0.5-millisecond TTI includes at least one same PRB index or includes at least one same RBG index as an uplink frequency domain resource on which the SRS is located, the preset time interval is less than or equal to m*0.5 milliseconds, and m is a non-zero integer.

If m is a negative integer, it indicates that the PUSCH is sent before a symbol on which the SRS is located. If m is a positive integer, it indicates that the PUSCH is sent after a symbol on which the SRS is located.

604. The base station receives the PUSCH that is at the 0.5-millisecond TTI and sent by the terminal device, and the base station receives the SRS sent by the terminal device, where the uplink frequency domain resource for the PUSCH sent at the 0.5-millisecond TTI includes at least one same frequency domain resource as an uplink frequency domain resource on which the SRS is located, the preset time interval is less than or equal to m*0.5 milliseconds, and m is a non-zero integer.

The frequency domain resources may include at least one same PRB index, or include at least one same RBG index.

In this embodiment, the PUSCH is a physical channel used to carry uplink data of the terminal device, and may also be used to transmit UCI of the terminal device.

It should be noted that this embodiment is extensible: If a time interval between a moment at which the base station receives the PUSCH that is at the 0.5-millisecond TTI and sent by the terminal device and a moment at which the base station receives the SRS sent by the terminal device is greater than m*0.5 milliseconds, and m is a non-zero integer, the base station does not perform step 605 and step 606, that is, does not determine or update a frequency offset value of the terminal device.

605. Determine a frequency offset value of the terminal device according to the SRS and a DM-RS on the PUSCH at the 0.5-millisecond TTI or according to a DM-RS and an SRS that are on the same frequency domain resource in the SRS as on the PUSCH at the 0.5-millisecond TTI.

The eNodeB determines the frequency offset value according to a phase difference between the uplink frequency domain resource for the SRS sent by the terminal device and the DM-RS on the PUSCH sent by the terminal device at the 0.5-millisecond TTI. Alternatively, the eNodeB determines the frequency offset value according to a phase difference between the DM-RS and the SRS in frequency domains with the same PRB index or the same RBG index on the uplink frequency domain resource for the SRS sent by the terminal device as on the uplink frequency domain resource for the PUSCH sent by the terminal device at the 0.5-millisecond TTI.

The uplink frequency domain resource for the SRS includes an entire code sequence of the SRS. The PUSCH sent by the terminal device at the 0.5-millisecond TTI includes an entire code sequence of the DM-RS. The base station may determine the frequency offset value according to a phase difference between the two code sequences.

A code sequence of the DM-RS on the frequency domain resource with the same PRB index or the same RBG index in the SRS as on the PUSCH sent at the 0.5-millisecond TTI may not be an entire code sequence of the DM-RS, that is, is merely a partial code sequence of the DM-RS on the PUSCH. Alternatively, a code sequence of the SRS in the frequency domain with the same PRB index or the same RBG index in the SRS as on the PUSCH sent at the 0.5-millisecond TTI may not be an entire code sequence of the SRS, that is, is merely a partial code sequence of the SRS on the PUSCH. The terminal device determines the frequency offset value according to a phase difference between the code sequence of the SRS and the code sequence of the DM-RS. The code sequence of the SRS may be the entire code sequence of the SRS, or may be the partial code sequence of the SRS. The code sequence of the DM-RS may be the entire code sequence of the DM-RS, or may be the partial code sequence of the DM-RS.

The code sequence may be any digital sequence, and is not limited herein, for example, a ZC (Zadoff-Chu) sequence.

The terminal device includes a DM-RS in the frequency domain with the same PRB index or RBG index at the 0.5-millisecond TTI.

606. The base station determines a historical frequency offset value of the terminal device according to the frequency offset value of the terminal device.

According to this embodiment of the present disclosure, the terminal device is instructed to send the PUSCH at the 0.5-millisecond TI and send the SRS, and the base station determines the historical frequency offset value of the terminal device based on the received SRS and the received DM-RS on the PUSCH at the 0.5-millisecond TTI. The frequency offset value does not need to be determined in an existing manner of adding a DM-RS symbol to each 0.5-millisecond TTI. Therefore, fewer reference signal resources are occupied, data transmission efficiency is improved, and reference signal system overheads are reduced.

Figure 7:
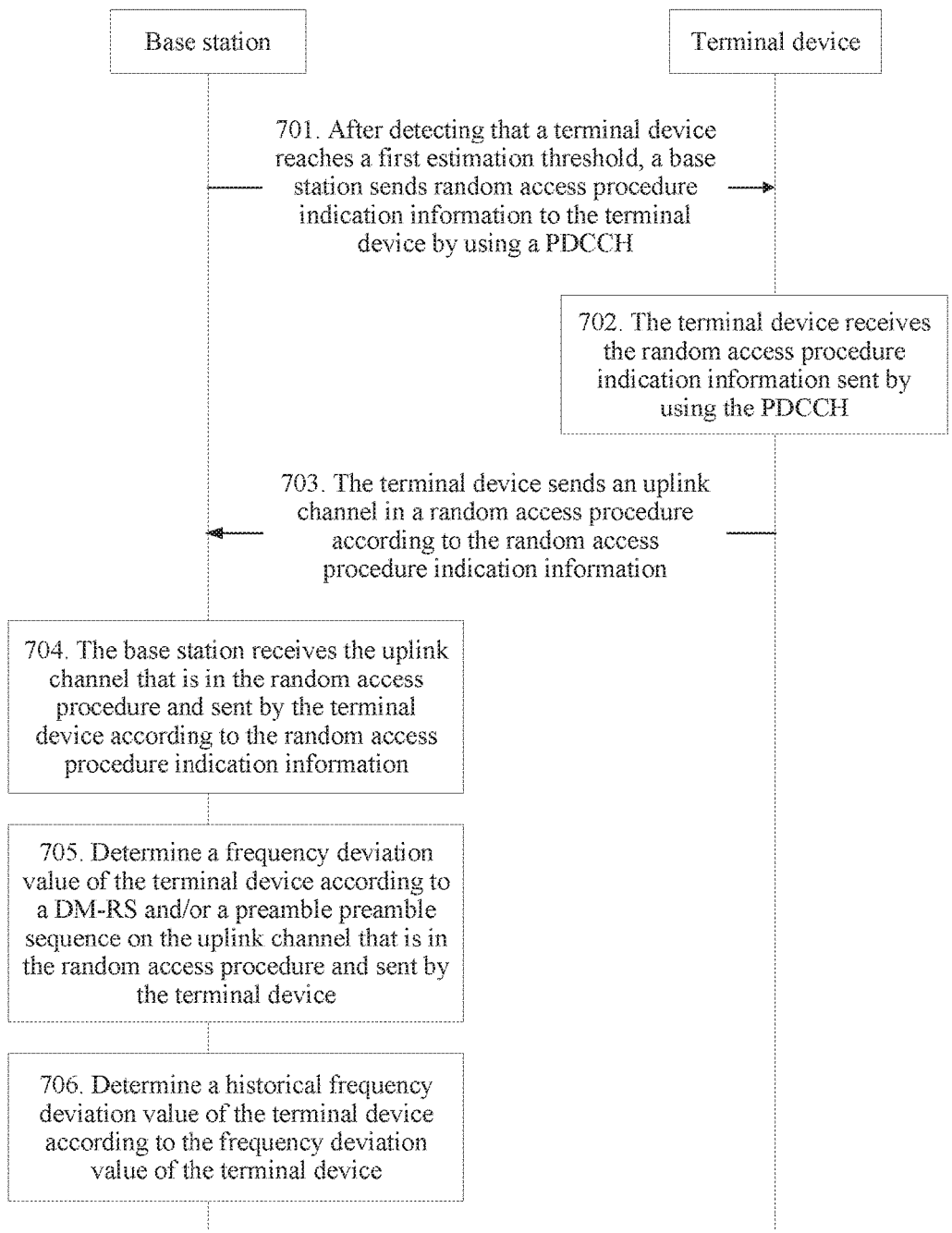
FIG. 7 is a flowchart of an uplink information demodulation method according to Embodiment 3 of the present disclosure.

Referring to FIG. 7, this embodiment of the present disclosure provides a method for determining a historical frequency offset value of a terminal device in another uplink information demodulation method. The method includes the following steps.

701. After detecting that a terminal device reaches a first estimation threshold, a base station sends random access procedure indication information to the terminal device by using a physical downlink control channel PDCCH.

The detecting that a terminal device reaches a first estimation threshold includes: one or more of the following parameters reach a specified threshold: a moving speed of the terminal device, a mean MCS change value of the terminal device, an MCS variance of the terminal device, a received BLER of a PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device.

In this embodiment of the present disclosure, a frequency offset value of the terminal device is determined by instructing the terminal device to trigger an uplink channel in a random access procedure.

702. The terminal device receives the random access procedure indication information sent by using the PDCCH.

703. The terminal device sends an uplink channel in a random access procedure according to the random access procedure indication information, where the uplink channel includes a PRACH and/or a PUSCH.

In this embodiment, the PUSCH is a physical channel used to carry uplink data of the terminal device, and may also be used to transmit UCI of the terminal device. The PRACH is used by the terminal to initiate communication with the base station. The terminal sends preamble information when performing random access. The base station receives and determines, by using the PRACH, an identity of the terminal that performs access; and calculates a delay of the terminal.

704. The base station receives the uplink channel that is in the random access procedure and sent by the terminal device according to the random access procedure indication information.

705. Determine a frequency offset value of the terminal device according to a DM-RS and/or a preamble sequence on the uplink channel that is in the random access procedure and sent by the terminal device, where the uplink channel includes the PRACH and/or the PUSCH.

1-millisecond-TTI uplink information transmission is to be performed on the PRACH and/or the PUSCH sent after the terminal device triggers the random access procedure. Correspondingly, when the terminal device performs 1-millisecond-TTI uplink information transmission, the eNodeB determines the frequency offset value by using an offset of a preamble sequence on the PRACH sent by the terminal device or a phase difference between two DM-RSs on the PUSCH sent by the terminal device. For example, the base station determines an uplink frequency offset value of the terminal device according to an offset status of the preamble sequence in the random access procedure.

706. Determine a historical frequency offset value of the terminal device according to the frequency offset value of the terminal device.

According to this embodiment of the present disclosure, the terminal device is instructed to send the uplink channel in the random access procedure, and the base station determines the historical frequency offset value of the terminal device based on the received DM-RSs on the uplink channel that is in the random access procedure and sent by the terminal device. The frequency offset value does not need to be determined in an existing manner of adding a DM-RS symbol to each 0.5-millisecond TTI. Therefore, fewer reference signal resources are occupied, data transmission efficiency is improved, and reference signal system overheads are reduced.

Figure 8:
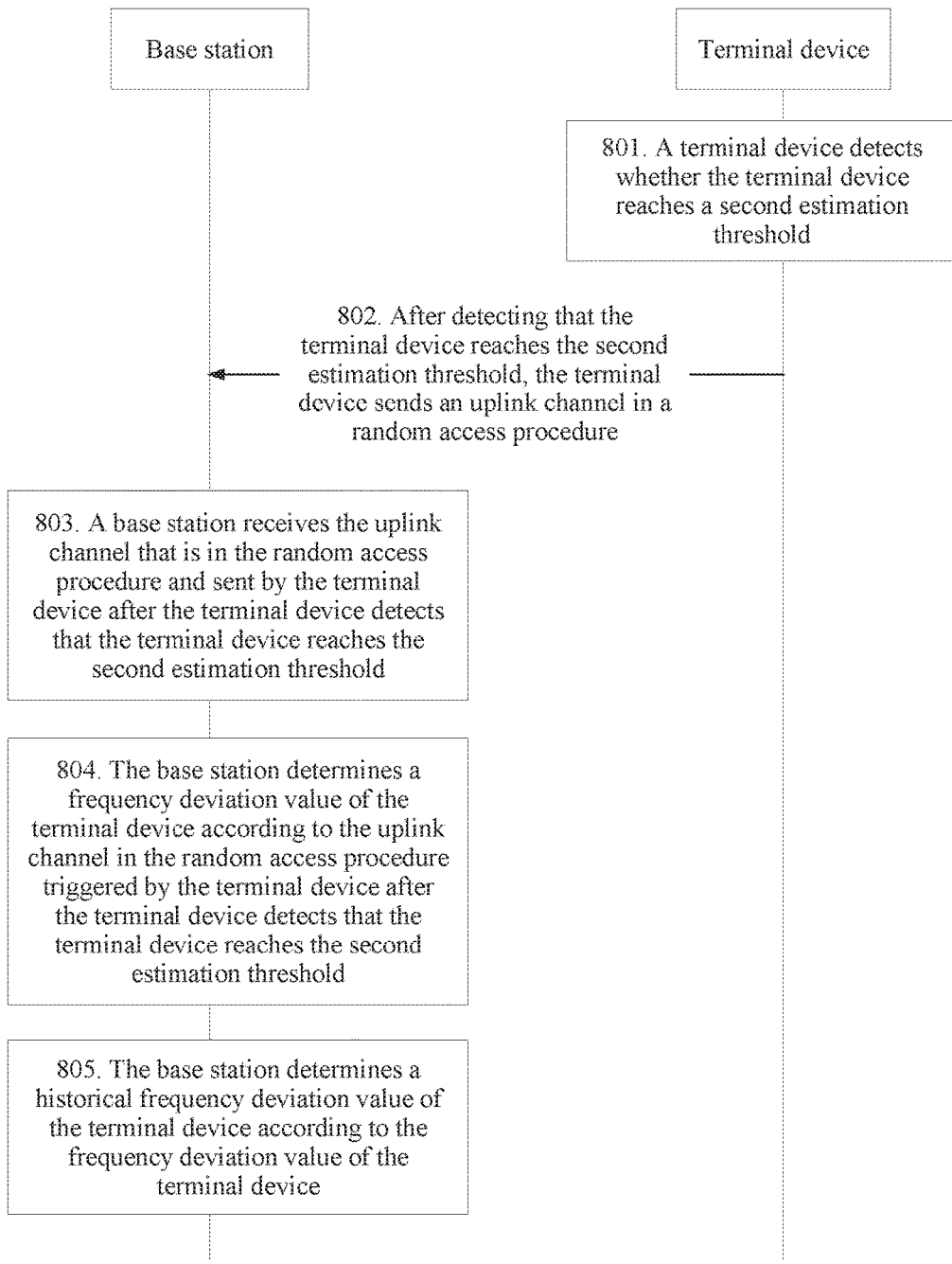
FIG. 8 is a flowchart of an uplink information demodulation method according to Embodiment 3 of the present disclosure.

Referring to FIG. 8, this embodiment of the present disclosure provides a method for determining a historical frequency offset value of a terminal device in another uplink information demodulation method. The method includes the following steps.

801. A terminal device detects whether the terminal device reaches a second estimation threshold, where the second estimation threshold includes: one or more of the following parameters reach a specified threshold: a moving speed of the terminal device, a difference between an expected MCS index value and an MCS index received by the terminal device, or a difference between an MCS index received by the terminal device and an MCS index corresponding to a CQI reported by the terminal device.

The second estimation threshold is preset in the terminal device.

That the terminal device detects that the terminal device reaches the second estimation threshold includes: one or more of the following parameters reach the specified threshold: the moving speed of the terminal device, the difference between an expected MCS index value and an MCS index received by the terminal device, or the difference between an MCS index received by the terminal device and an MCS index corresponding to a CQI reported by the terminal device.

802. After detecting that the terminal device reaches the second estimation threshold, the terminal device sends an uplink channel in a random access procedure, where the uplink channel includes a PRACH and/or a PUSCH.

803. A base station receives the uplink channel that is in the random access procedure and sent by the terminal device after the terminal device detects that the terminal device reaches the second estimation threshold, where the uplink channel includes the PRACH and/or the PUSCH, and the second estimation threshold includes: one or more of the following parameters reach the specified threshold: the moving speed of the terminal device, the difference between an expected MCS index value and an MCS index received by the terminal device, or the difference between an MCS index received by the terminal device and an MCS index corresponding to a CQI reported by the terminal device.

804. The base station determines a frequency offset value of the terminal device according to the uplink channel in the random access procedure triggered by the terminal device after the terminal device detects that the terminal device reaches the second estimation threshold, where the uplink channel includes the PRACH and/or the PUSCH.

In this embodiment, the PUSCH is a physical channel used to carry uplink data of the terminal device, and may also be used to transmit UCI of the terminal device. The PRACH is used by the terminal to initiate communication with the base station. The terminal sends preamble information when performing random access. The base station receives and determines, by using the PRACH, an identity of the terminal that performs access; and calculates a delay of the terminal.

1-millisecond-TTI uplink information transmission is to be performed on the PRACH and/or the PUSCH sent after the terminal device triggers the random access procedure. Correspondingly, when the terminal device performs 1-millisecond-TTI uplink information transmission, the eNodeB determines the frequency offset value by using a offset of a preamble sequence on the PRACH sent by the terminal device or a phase difference between two DM-RSs on the PUSCH sent by the terminal device.

805. The base station determines a historical frequency offset value of the terminal device according to the frequency offset value of the terminal device.

According to this embodiment of the present disclosure, when the terminal device reaches the second estimation threshold, the terminal device triggers sending of the uplink channel in the random access procedure, and the base station determines the historical frequency offset value of the terminal device based on the uplink channel that is in the random access procedure and sent by the terminal device. The frequency offset value does not need to be determined in an existing manner of adding a DM-RS symbol to each 0.5-millisecond TTI. Therefore, fewer reference signal resources are occupied, data transmission efficiency is improved, and reference signal system overheads are reduced.

Embodiment 4

Figure 9:
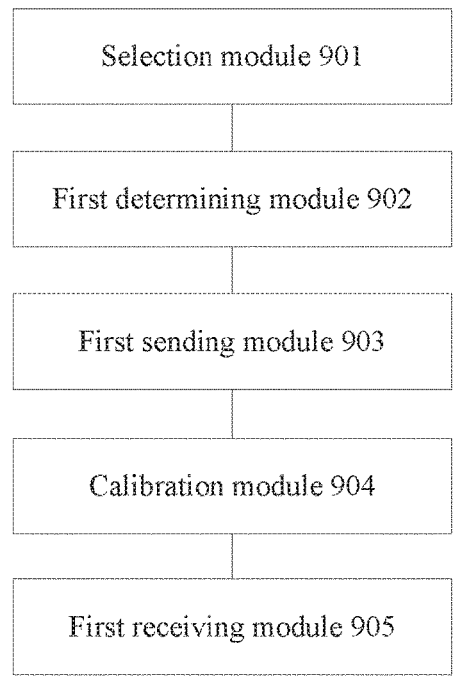
FIG. 9 is a schematic structural diagram of a base station according to Embodiment 4 of the present disclosure.

Referring to FIG. 9, this embodiment of the present disclosure provides a base station.

The base station includes:

a selection module 901, configured to select a first modulation and coding scheme MCS index for a terminal device according to channel quality of the terminal device and/or a received target block error rate BLER of a physical uplink shared channel PUSCH of the terminal device:

a first determining module 902, configured to determine a second MCS index according to an MCS index reduction value and the first MCS index, where the MCS index reduction value is used to perform reduction processing on the first MCS index to obtain the second MCS index:

a first sending module 903, configured to send the second MCS index to the terminal device;

a calibration module 904, configured to perform frequency offset calibration on a frequency of the terminal device according to a historical frequency offset value of the terminal device, where the historical frequency offset value is a stored frequency offset value of the terminal device; and a first receiving module 905, configured to: receive uplink information sent by the terminal device according to the second MCS index, and demodulate the PUSCH according to a frequency obtained after the frequency offset calibration.

The uplink information may include a reference signal, a sounding signal, and a physical channel.

In this embodiment of the present disclosure, real-time frequency offset estimation is not performed on the uplink information of the terminal device. Therefore, due to impact of a factor such as a current moving speed and channel quality of the terminal device, frequency offset calibration performed by the eNodeB on the frequency of the terminal device according to a prerecorded historical frequency offset value of the terminal device may be inaccurate, and accordingly, demodulation of the PUSCH of the terminal device is inaccurate.

Therefore, in this embodiment of the present disclosure, the MCS index reduction value is preset on the eNodeB, and subtraction processing is performed, by using the MCS index reduction value, on the MCS index determined according to the channel quality of the terminal device and/or the received BLER of the PUSCH of the terminal device, so as to reduce a value of an MCS index sent to the terminal device. That is, the MCS index=n, the preset MCS index reduction value=x, and the second MCS index=n−x.

A manner of sending the second MCS index to the terminal device may include but is not limited to a PDCCH or an EPDCCH.

It should be noted that the MCS index determined by the base station according to the channel quality of the terminal device may include but is not limited to: an MCS index determined by the base station according to a CQI reported by the terminal device, an MCS index determined by the base station according to RSRP reported by the terminal device, an MCS index determined by the base station according to RSRQ reported by the terminal device, an MCS index determined by the base station according to an SRS reported by the terminal device, or an MCS index determined by the base station in another manner that may represent the channel quality of the terminal device. This is not limited herein.

The base station in this embodiment may implement the procedure in the embodiment of the present disclosure shown in FIG. 1.

Optionally, the first determining module 902 is further configured to: after the terminal device performs 1-millisecond-TTI uplink information transmission, determine a frequency offset value of the terminal device according to DM-RSs on a PUSCH that is at a 1-millisecond TTI and sent by the terminal device.

Optionally, the first determining module 902 is further configured to determine the historical frequency offset value of the terminal device according to the frequency offset value of the terminal device.

In this embodiment, the PUSCH is a physical channel used to carry uplink data of the terminal device, and may also be used to transmit UCI of the terminal device.

A manner in which the base station determines the historical frequency offset value of the terminal device may include but is not limited to the following manner: The base station obtains, by means of calculation, the frequency offset value by using a phase difference between the two DM-RSs, and stores the frequency offset value or replaces the historical frequency offset value of the terminal device.

Alternatively, based on the foregoing modules, the base station in this embodiment may implement the procedure in the embodiment of the present disclosure shown in FIG. 3.

Optionally, the first sending module 903 is further configured to: after it is detected that the terminal device reaches a first estimation threshold, send at least one piece of first resource indication information to the terminal device. The first resource indication information is used to indicate uplink frequency domain resources for PUSCHs at two 0.5-millisecond TTIs. That it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of hybrid automatic repeat request HARQ retransmission times of a PUSCH of the terminal device, an error rate or a quantity of errors of a Media Access Control MAC packet/Radio Link Control RLC packet/Transmission Control Protocol TCP packet/Internet Protocol IP packet of the terminal device, a quantity of automatic repeat requests ARQs of a MAC packet of the terminal device, or quality of service QoS of a service corresponding to the terminal device.

Optionally, the first receiving module 905 is further configured to receive the PUSCHs that are at the two 0.5-millisecond TTIs and sent by the terminal device. The uplink frequency domain resources for the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer.

It should be noted that this embodiment is extensible: If a time interval at which the PUSCHs that are at the two 0.5-millisecond TTIs and sent by the terminal device is greater than n*0.5 milliseconds, and n is a non-zero positive integer, the base station does not perform, by using the first determining module 902, the steps of determining or updating the frequency offset value of the terminal device.

Optionally, the first determining module 902 is further configured to determine a frequency offset value of the terminal device according to two DM-RSs on the PUSCHs at the two 0.5-millisecond TTIs or according to two DM-RSs in frequency domains with a same PRB index or a same RBG index on the PUSCHs at the two 0.5-millisecond TTIs.

Optionally, the first determining module 902 is further configured to determine the historical frequency offset value of the terminal device according to the frequency offset value of the terminal device.

The eNodeB may determine the frequency offset value of the terminal device according to a phase difference between the two DM-RSs on the PUSCHs at the two 0.5-millisecond TTIs. The PUSCH at each 0.5-millisecond TI includes one DM-RS. Alternatively, the eNodeB may determine the frequency offset value according to a phase difference between the two DM-RSs in frequency domains with the same PRB index or RBG index on the PUSCHs at the two 0.5-millisecond TTIs.

Code sequences of the two DM-RSs in the frequency domains with the same PRB index or the same RBG index on the PUSCHs sent at the two 0.5-millisecond TTIs may not be entire code sequences of the DM-RSs, that is, are merely partial code sequences of the DM-RSs on the PUSCHs. The base station may determine the frequency offset value according to a phase difference between the partial code sequences of the two DM-RSs in the frequency domains with the same PRB index or the same RBG index. The code sequence may be any digital sequence, and is not limited herein, for example, a ZC (Zadoff-Chu) sequence.

In this embodiment, the PUSCH is a physical channel used to carry uplink data of the terminal device, and may also be used to transmit UCI of the terminal device.

Alternatively, based on the foregoing modules, the base station in this embodiment may implement the procedure implemented on a base station side in the embodiment of the present disclosure shown in FIG. 4.

Optionally, the first sending module 903 is further configured to: after it is detected that the terminal device reaches a first estimation threshold, send mode instruction information to the terminal device. The mode instruction information is used to instruct the terminal device to change from a mode of sending 0.5-millisecond-TTI uplink information to a mode of sending 1-millisecond-TTI uplink information.

That it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device.

Optionally, the first receiving module 905 is further configured to receive a PUSCH that is at a 1-millisecond TTI and sent by the terminal device.

Optionally, the first determining module 902 is further configured to determine a frequency offset value of the terminal device according to DM-RSs on the PUSCH that is at the 1-millisecond TTI and sent by the terminal device.

Optionally, the first determining module 902 is further configured to determine the historical frequency offset value of the terminal device according to the frequency offset value of the terminal device.

In this embodiment, the PUSCH is a physical channel used to carry uplink data of the terminal device, and may also be used to transmit UCI of the terminal device.

Alternatively, based on the foregoing modules, the base station in this embodiment may implement the procedure implemented on a base station side in the embodiment of the present disclosure shown in FIG. 5.

Optionally, the first sending module 903 is further configured to: after it is detected that the terminal device reaches a first estimation threshold, send at least one piece of second resource indication information to the terminal device within a preset time interval contiguous to a moment at which the terminal device sends a sounding reference signal SRS. The second resource indication information is used to indicate an uplink frequency domain resource for a PUSCH at a 0.5-millisecond TTI. That it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device.

Optionally, the first receiving module 905 is further configured to: receive the PUSCH that is at the 0.5-millisecond TTI and sent by the terminal device, and receive the SRS sent by the terminal device. The uplink frequency domain resource for the PUSCH sent at the 0.5-millisecond TTI includes at least one same frequency domain resource as an uplink frequency domain resource on which the SRS is located, the preset time interval is less than or equal to m*0.5 milliseconds, and m is a non-zero integer.

In this manner, the eNodeB sends DCI to the terminal device by using a PDCCH or an EPDCCH, and indicates the uplink frequency domain resource for the PUSCH at the 0.5-millisecond TTI to the terminal device in the DCI. The uplink frequency domain resource of the terminal device for the PUSCH at the 0.5-millisecond TTI needs to have a same frequency domain resource as the SRS sent by the terminal device.

In this embodiment, the PUSCH is a physical channel used to carry uplink data of the terminal device, and may also be used to transmit UCI of the terminal device.

The eNodeB knows a sending time of a periodic or aperiodic SRS (sounding reference signal) of each terminal device. Therefore, within a preset time interval before or after the terminal device sends the SRS, the eNodeB may schedule the terminal device to send a PUSCH, so that an uplink frequency domain resource on which the terminal device sends the SRS has a same frequency domain resource as an uplink frequency domain resource on which the terminal device is scheduled to send the PUSCH, thereby determining a frequency offset value of the terminal device.

Optionally, the first determining module 902 is further configured to determine a frequency offset value of the terminal device according to the SRS and a DM-RS on the PUSCH at the 0.5-millisecond TTI or according to a DM-RS and an SRS that are on the same frequency domain resource in the SRS as on the PUSCH at the 0.5-millisecond TTI.

The eNodeB determines the frequency offset value according to a phase difference between the uplink frequency domain resource for the SRS sent by the terminal device and the DM-RS on the PUSCH sent by the terminal device at the 0.5-millisecond TTI. Alternatively, the eNodeB determines the frequency offset value according to a phase difference between the uplink frequency domain resource for the SRS sent by the terminal device and the DM-RS in a frequency domain with the same PRB index or the same RBG index of the terminal device at the 0.5-millisecond TTI.

The uplink frequency domain resource for the SRS includes an entire code sequence of the SRS. The PUSCH sent by the terminal device at the 0.5-millisecond TTI includes an entire code sequence of the DM-RS. The base station may determine the frequency offset value according to a phase difference between the two code sequences.

A code sequence of the DM-RS on the frequency domain resource with the same PRB index or the same RBG index in the SRS as on the PUSCH sent at the 0.5-millisecond TTI may not be an entire code sequence of the DM-RS, that is, is merely a partial code sequence of the DM-RS on the PUSCH. Alternatively, a code sequence of the SRS in the frequency domain with the same PRB index or the same RBG index in the SRS as on the PUSCH sent at the 0.5-millisecond TTI may not be an entire code sequence of the SRS, that is, is merely a partial code sequence of the SRS on the PUSCH. The terminal device determines the frequency offset value according to a phase difference between the code sequence of the SRS and the code sequence of the DM-RS. The code sequence of the SRS may be the entire code sequence of the SRS, or may be the partial code sequence of the SRS. The code sequence of the DM-RS may be the entire code sequence of the DM-RS, or may be the partial code sequence of the DM-RS.

The code sequence may be any digital sequence, and is not limited herein, for example, a ZC (Zadoff-Chu) sequence.

Optionally, the first determining module 902 is further configured to determine the historical frequency offset value of the terminal device according to the frequency offset value of the terminal device.

It should be noted that this embodiment is extensible: If a time interval between a moment at which the base station receives the PUSCH that is at the 0.5-millisecond TTI and sent by the terminal device and a moment at which the base station receives the SRS sent by the terminal device is greater than m*0.5 milliseconds, and m is a non-zero integer, the base station does not perform the module procedure steps by using the first determining module 902, that is, does not determine or update the frequency offset value of the terminal device.

Alternatively, based on the foregoing modules, the base station in this embodiment may implement the procedure implemented on a base station side in the embodiment of the present disclosure shown in FIG. 6.

Optionally, the first sending module 903 is further configured to: after it is detected that the terminal device reaches a first estimation threshold, send random access procedure indication information to the terminal device by using a physical downlink control channel PDCCH. That it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device.

Optionally, the first receiving module 905 is further configured to receive an uplink channel that is in a random access procedure and sent by the terminal device according to the random access procedure indication information.

Optionally, the first determining module 902 is further configured to determine a frequency offset value of the terminal device according to a DM-RS and/or a preamble sequence on the uplink channel that is in the random access procedure and sent by the terminal device. The uplink channel includes a physical random access channel PRACH and/or a PUSCH.

Optionally, the first determining module 902 is further configured to determine the historical frequency offset value of the terminal device according to the frequency offset value of the terminal device.

1-millisecond-TTI uplink information transmission is to be performed on the PRACH and/or the PUSCH sent after the terminal device triggers the random access procedure. Correspondingly, when the terminal device performs 1-millisecond-TTI uplink information transmission, the eNodeB determines the frequency offset value by using a offset of a preamble sequence on the PRACH sent by the terminal device or a phase difference between two DM-RSs on the PUSCH sent by the terminal device. For example, the base station determines an uplink frequency offset value of the terminal device according to a offset status of the preamble sequence in the random access procedure.

In this embodiment, the PUSCH is a physical channel used to carry uplink data of the terminal device, and may also be used to transmit UCI of the terminal device. The PRACH is used by the terminal to initiate communication with the base station. The terminal sends preamble information when performing random access. The base station receives and determines, by using the PRACH, an identity of the terminal that performs access; and calculates a delay of the terminal.

Alternatively, based on the foregoing modules, the base station in this embodiment may implement the procedure implemented on a base station side in the embodiment of the present disclosure shown in FIG. 7.

Optionally, the first receiving module 905 is further configured to receive an uplink channel that is in a random access procedure and sent by the terminal device after the terminal device detects that the terminal device reaches a second estimation threshold. The uplink channel includes a PRACH and/or a PUSCH. The second estimation threshold includes: one or more of the following parameters reach a specified threshold: a moving speed of the terminal device, a difference between an expected MCS index value and an MCS index received by the terminal device, or a difference between an MCS index received by the terminal device and an MCS index corresponding to a CQI reported by the terminal device.

Optionally, the first determining module 902 is further configured to determine a frequency offset value of the terminal device according to the uplink channel in the random access procedure triggered by the terminal device after the terminal device detects that the terminal device reaches the second estimation threshold. The uplink channel includes the PRACH and/or the PUSCH.

Optionally, the first determining module 902 is further configured to determine the historical frequency offset value of the terminal device according to the frequency offset value of the terminal device.

In this embodiment, the PUSCH is a physical channel used to carry uplink data of the terminal device, and may also be used to transmit UCI of the terminal device. The PRACH is used by the terminal to initiate communication with the base station. The terminal sends preamble information when performing random access. The base station receives and determines, by using the PRACH, an identity of the terminal that performs access; and calculates a delay of the terminal.

Alternatively, based on the foregoing modules, the base station in this embodiment may implement the procedure implemented on a base station side in the embodiment of the present disclosure shown in FIG. 8.

According to this embodiment of the present disclosure, after the MCS index is selected for the terminal device, reduction processing is performed on the MCS index according to a preset MCS index reduction exponent, a reduced MCS index is indicated to the terminal device, frequency offset estimation is performed on the terminal device by using the recorded historical frequency offset value, and the PUSCH sent by the terminal device according to the reduced MCS index is demodulated after the frequency offset estimation. Frequency calibration is performed by using the prerecorded historical frequency offset value, so that the frequency offset value does not need to be determined in an existing manner of adding a DM-RS symbol to a 0.5-millisecond TTI. Therefore, fewer resources are occupied, data transmission efficiency is improved, and reference signal system overheads are reduced.

In addition, the terminal device performs 1-millisecond-TTI uplink information transmission, and the historical frequency offset value of the terminal device is determined based on the DM-RSs on the PUSCH at the 1-millisecond TTI. Alternatively, the terminal device is instructed to send the PUSCHs at the two 0.5-millisecond TTIs, and the base station determines the historical frequency offset value of the terminal device based on the two received DM-RSs on the PUSCHs sent at the two 0.5-millisecond TTIs. Alternatively, the terminal device is instructed to send the PUSCH at the 1-millisecond TTI, and the base station determines the historical frequency offset value of the terminal device based on the two received DM-RSs on the PUSCH at the 1-millisecond TTI. Alternatively, the terminal device is instructed to send the PUSCH at the 0.5-millisecond TTI and send the SRS, and the base station determines the historical frequency offset value of the terminal device based on the received SRS and the received DM-RS on the PUSCH at the 0.5-millisecond TTI. Alternatively, the terminal device is instructed to send the uplink channel in the random access procedure, and the base station determines the historical frequency offset value of the terminal device based on the received DM-RSs on the uplink channel that is in the random access procedure and sent by the terminal device. Alternatively, when the terminal device reaches the second estimation threshold, the terminal device triggers sending of the uplink channel in the random access procedure, and the base station determines the historical frequency offset value of the terminal device based on the uplink channel that is in the random access procedure and sent by the terminal device. The base station determines the historical frequency offset value in the foregoing manners, so that the frequency offset value does not need to be determined in the existing manner of adding a DM-RS symbol to a 0.5-millisecond TTI. Therefore, fewer resources are occupied, data transmission efficiency is improved, and reference signal system overheads are reduced.

Embodiment 5

Figure 10:
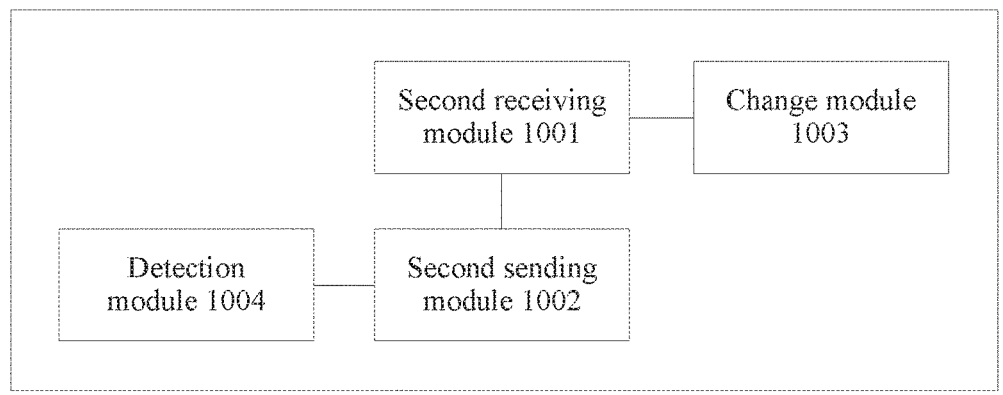
FIG. 10 is a schematic structural diagram of a terminal device according to Embodiment 5 of the present disclosure.

Referring to FIG. 10, this embodiment of the present disclosure provides a terminal device.

The terminal device includes:

a second receiving module 1001, configured to receive a second modulation and coding scheme MCS index, where the second MCS index is obtained after a base station performs reduction processing on a first MCS index according to an MCS index reduction value, and the first MCS index is selected by the base station according to channel quality of the terminal device and/or a received target block error rate BLER of a physical uplink shared channel PUSCH of the terminal device; and a second sending module 1002, configured to send uplink information according to the second MCS index.

The uplink information may include a reference signal, a sounding signal. and a physical channel.

The terminal device in this embodiment may implement the procedure in the embodiment of the present disclosure shown in FIG. 2.

Optionally, the second receiving module 1001 is further configured to receive at least one piece of first resource indication information. The first resource indication information is used to indicate uplink frequency domain resources for PUSCHs at two 0.5-millisecond TTIs, the uplink frequency domain resources for sending the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer.

Optionally, the second sending module 1002 is further configured to send the PUSCHs at the two 0.5-millisecond TTIs according to the first resource indication information.

In this embodiment, the PUSCH is a physical channel used to carry uplink data of the terminal device, and may also be used to transmit UCI of the terminal device.

Alternatively, based on the foregoing modules, the terminal device in this embodiment may implement the procedure implemented on a terminal device side in the embodiment of the present disclosure shown in FIG. 4.

Optionally, the apparatus further includes a change module 1003.

Optionally, the second receiving module 1001 is further configured to receive mode instruction information. The mode instruction information is used to instruct the terminal device to change from a mode of sending 0.5-millisecond-TTI uplink information to a mode of sending 1-millisecond-TTI uplink information.

It should be noted that, that the terminal device changes, according to the mode instruction information, from the mode of sending 0.5-millisecond-TTI uplink information to the mode of sending 1-millisecond-TTI uplink information may be: after receiving the mode instruction information, the terminal device immediately changes to the mode of sending 1-millisecond-TTI uplink information; or may be: after X slots, the terminal device changes to the mode of sending 1-millisecond-TTI uplink information. X is a positive integer greater than or equal to 6.

Optionally, the change module 1003 is configured to change, according to the mode instruction information, from the mode of sending 0.5-millisecond-TTI uplink information to the mode of sending 1-millisecond-TTI uplink information.

Optionally, the second sending module 1002 is further configured to send a PUSCH at a 1-millisecond TTI.

In this embodiment, the PUSCH is a physical channel used to carry uplink data of the terminal device, and may also be used to transmit UCI of the terminal device.

Alternatively, based on the foregoing modules, the terminal device in this embodiment may implement the procedure implemented on a terminal device side in the embodiment of the present disclosure shown in FIG. 5.

Optionally; the second receiving module 1001 is further configured to receive at least one piece of second resource indication information. The second resource indication information is used to indicate an uplink frequency domain resource for a PUSCH at a 0.5-millisecond TTI.

Optionally, the second sending module 1002 is further configured to: send the PUSCH at the 0.5-millisecond TTI according to the second resource indication information, and send an SRS.

The uplink frequency domain resource for the PUSCH sent at the 0.5-millisecond TTI includes at least one same PRB index or includes at least one same RBG index as an uplink frequency domain resource on which the SRS is located. a preset time interval is less than or equal to m*0.5 milliseconds, and m is a non-zero integer.

If m is a negative integer, it indicates that the PUSCH is sent before a symbol on which the SRS is located. If m is a positive integer, it indicates that the PUSCH is sent after a symbol on which the SRS is located.

In this embodiment, the PUSCH is a physical channel used to carry uplink data of the terminal device, and may also be used to transmit UCI of the terminal device.

Alternatively, based on the foregoing modules, the terminal device in this embodiment may implement the procedure implemented on a terminal device side in the embodiment of the present disclosure shown in FIG. 6.

Optionally; the second receiving module 1001 is further configured to receive random access procedure indication information sent by using a PDCCH.

Optionally, the second sending module 1002 is further configured to send an uplink channel in a random access procedure according to the random access procedure indication information. The uplink channel includes a PRACH and/or a PUSCH.

1-millisecond-TTI uplink information transmission is to be performed on the PRACH and/or the PUSCH sent after the terminal device triggers the random access procedure.

In this embodiment, the PUSCH is a physical channel used to carry uplink data of the terminal device, and may also be used to transmit UCI of the terminal device. The PRACH is used by the terminal to initiate communication with the base station. The terminal sends preamble information when performing random access. The base station receives and determines, by using the PRACH, an identity of the terminal that performs access; and calculates a delay of the terminal.

Alternatively, based on the foregoing modules, the terminal device in this embodiment may implement the procedure implemented on a terminal device side in the embodiment of the present disclosure shown in FIG. 7.

Optionally, the apparatus further includes a detection module 1004.

The detection module 1004 is configured to detect whether the terminal device reaches a second estimation threshold. The second estimation threshold includes: one or more of the following parameters reach a specified threshold: a moving speed of the terminal device, a difference between an expected MCS index value and an MCS index received by the terminal device, or a difference between an MCS index received by the terminal device and an MCS index corresponding to a CQI reported by the terminal device.

Optionally, the second sending module 1002 is further configured to: after it is detected that the terminal device reaches the second estimation threshold, send an uplink channel in a random access procedure. The uplink channel includes a PRACH and/or a PUSCH.

1-millisecond-TTI uplink information transmission is to be performed on the PRACH and/or the PUSCH sent after the terminal device triggers the random access procedure.

In this embodiment, the PUSCH is a physical channel used to carry uplink data of the terminal device, and may also be used to transmit UCI of the terminal device. The PRACH is used by the terminal to initiate communication with the base station. The terminal sends preamble information when performing random access. The base station receives and determines, by using the PRACH, an identity of the terminal that performs access; and calculates a delay of the terminal.

Alternatively, based on the foregoing modules, the terminal device in this embodiment may implement the procedure implemented on a terminal device side in the embodiment of the present disclosure shown in FIG. 8.

According to this embodiment of the present disclosure, the terminal device sends the uplink information according to a reduced MCS index, so as to reduce a rate at which the terminal device sends the uplink information to the base station. In this way, when frequency calibration performed by the base station by using a historical frequency offset value is inaccurate, reliability of the uplink information is improved, and an accuracy rate of the uplink information sent by the terminal device is accordingly improved.

Embodiment 6

Figure 11:
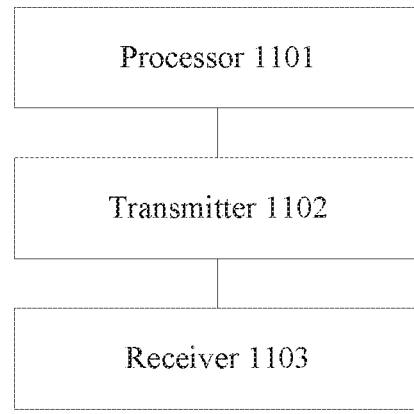
FIG. 11 is a schematic structural diagram of a base station according to Embodiment 6 of the present disclosure.

Referring to FIG. 11, this embodiment of the present disclosure provides a base station.

The base station includes a processor 1101. a transmitter 1102, and a receiver 1103.

The processor 1101 is configured to: select a first modulation and coding scheme MCS index for a terminal device according to channel quality of the terminal device and/or a received target block error rate BLER of a physical uplink shared channel PUSCH of the terminal device: determine a reduced second MCS index according to an MCS index reduction value and the first MCS index, where the MCS index reduction value is used to perform reduction processing on the first MCS index to obtain the second MCS index: perform frequency offset calibration on a frequency of the terminal device according to a historical frequency offset value of the terminal device, where the historical frequency offset value is a frequency offset value of the terminal device that is stored in the base station; and demodulate the PUSCH according to a frequency obtained after the frequency offset calibration.

The transmitter 1102 is configured to send the second MCS index to the terminal device.

The receiver 1103 is configured to receive uplink information sent by the terminal device according to the second MCS index.

The uplink information may include a reference signal, a sounding signal. and a physical channel.

In this embodiment of the present disclosure, real-time frequency offset estimation is not performed on the uplink information of the terminal device. Therefore, due to impact of a factor such as a current moving speed and channel quality of the terminal device, frequency offset calibration performed by the eNodeB on the frequency of the terminal device according to a prerecorded historical frequency offset value of the terminal device may be inaccurate, and accordingly, demodulation of the PUSCH of the terminal device is inaccurate.

Therefore, in this embodiment of the present disclosure, the MCS index reduction value is preset on the eNodeB, and subtraction processing is performed, by using the MCS index reduction value, on the MCS index determined according to the channel quality of the terminal device and/or the received BLER of the PUSCH of the terminal device, so as to reduce a value of an MCS index sent to the terminal device. That is, the MCS index=n, the preset MCS index reduction value=x, and the second MCS index=n−x.

A manner of sending the second MCS index to the terminal device may include but is not limited to a PDCCH or an EPDCCH.

It should be noted that the MCS index determined by the base station according to the channel quality of the terminal device may include but is not limited to: an MCS index determined by the base station according to a CQI reported by the terminal device, an MCS index determined by the base station according to RSRP reported by the terminal device, an MCS index determined by the base station according to RSRQ reported by the terminal device, an MCS index determined by the base station according to an SRS reported by the terminal device, or an MCS index determined by the base station in another manner that may represent the channel quality of the terminal device. This is not limited herein.

The base station in this embodiment may implement the procedure in the embodiment of the present disclosure shown in FIG. 1.

Optionally, the processor 1101 is further configured to: after the terminal device performs 1-millisecond-TTI uplink information transmission, determine a frequency offset value of the terminal device according to DM-RSs on a PUSCH that is at a 1-millisecond TTI and sent by the terminal device, and determine the historical frequency offset value of the terminal device according to the frequency offset value of the terminal device.

Optionally, the base station in this embodiment may implement the procedure in the embodiment of the present disclosure shown in FIG. 3.

A manner in which the base station determines the historical frequency offset value of the terminal device may include but is not limited to the following manner: The base station obtains, by means of calculation, the frequency offset value by using a phase difference between the two DM-RSs, and stores the frequency offset value or replaces the historical frequency offset value of the terminal device.

Optionally, the transmitter 1102 is further configured to: after it is detected that the terminal device reaches a first estimation threshold, send at least one piece of first resource indication information to the terminal device. The first resource indication information is used to indicate uplink frequency domain resources for PUSCHs at two 0.5-millisecond TTIs. That it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of hybrid automatic repeat request HARQ retransmission times of a PUSCH of the terminal device, an error rate or a quantity of errors of a Media Access Control MAC packet/Radio Link Control RLC packet/Transmission Control Protocol TCP packet/Internet Protocol IP packet of the terminal device, a quantity of automatic repeat requests ARQs of a MAC packet of the terminal device, or quality of service QoS of a service corresponding to the terminal device.

Optionally, the receiver 1103 is further configured to receive the PUSCHs that are at the two 0.5-millisecond TTIs and sent by the terminal device. The uplink frequency domain resources for the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer.

Optionally, the processor 1101 is further configured to: determine a frequency offset value of the terminal device according to two DM-RSs on the PUSCHs at the two 0.5-millisecond TTIs or according to two DM-RSs in frequency domains with a same PRB index or a same RBG index on the PUSCHs at the two 0.5-millisecond TTIs; and determine the historical frequency offset value of the terminal device according to the frequency offset value of the terminal device.

The eNodeB may determine the frequency offset value of the terminal device according to a phase difference between the two DM-RSs on the PUSCHs at the two 0.5-millisecond TTIs. The PUSCH at each 0.5-millisecond TTI includes one DM-RS. Alternatively, the eNodeB may determine the frequency offset value according to a phase difference between the two DM-RSs in frequency domains with the same PRB index or RBG index on the PUSCHs at the two 0.5-millisecond TTIs.

Code sequences of the two DM-RSs in the frequency domains with the same PRB index or the same RBG index on the PUSCHs sent at the two 0.5-millisecond TTIs may not be entire code sequences of the DM-RSs, that is, are merely partial code sequences of the DM-RSs on the PUSCHs. The base station may determine the frequency offset value according to a phase difference between the partial code sequences of the two DM-RSs in the frequency domains with the same PRB index or the same RBG index. The code sequence may be any digital sequence, and is not limited herein, for example, a ZC (Zadoff-Chu) sequence.

In this embodiment, the PUSCH is a physical channel used to carry uplink data of the terminal device, and may also be used to transmit UCI of the terminal device.

Alternatively, the base station in this embodiment may implement the procedure implemented on a base station side in the embodiment of the present disclosure shown in FIG. 4.

It should be noted that this embodiment is extensible: If a time interval at which the PUSCHs that are at the two 0.5-millisecond TTIs and sent by the terminal device is greater than n*0.5 milliseconds, and n is a non-zero positive integer, the processor does not perform the steps of determining or updating the frequency offset value of the terminal device.

Optionally, the transmitter 1102 is further configured to: after it is detected that the terminal device reaches a first estimation threshold, send mode instruction information to the terminal device. The mode instruction information is used to instruct the terminal device to change from a mode of sending 0.5-millisecond-TTI uplink information to a mode of sending 1-millisecond-TTI uplink information. That it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device.

Optionally, the receiver 1103 is further configured to receive a PUSCH that is at a 1-millisecond TTI and sent by the terminal device.

Optionally, the processor 1101 is further configured to: determine a frequency offset value of the terminal device according to DM-RSs on the PUSCH that is at the 1-millisecond TTI and sent by the terminal device; and determine the historical frequency offset value of the terminal device according to the frequency offset value of the terminal device.

In this embodiment, the PUSCH is a physical channel used to carry uplink data of the terminal device, and may also be used to transmit UCI of the terminal device.

Alternatively, the base station in this embodiment may implement the procedure implemented on a base station side in the embodiment of the present disclosure shown in FIG. 5.

Optionally, the transmitter 1102 is further configured to: after it is detected that the terminal device reaches a first estimation threshold, send at least one piece of second resource indication information to the terminal device within a preset time interval contiguous to a moment at which the terminal device sends a sounding reference signal SRS. The second resource indication information is used to indicate an uplink frequency domain resource for a PUSCH at a 0.5-millisecond TTI. That it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device.

Optionally, the receiver 1103 is further configured to: receive the PUSCH that is at the 0.5-millisecond TTI and sent by the terminal device, and receive the SRS sent by the terminal device. The uplink frequency domain resource for the PUSCH sent at the 0.5-millisecond TTI includes at least one same frequency domain resource as an uplink frequency domain resource on which the SRS is located, the preset time interval is less than or equal to m*0.5 milliseconds, and m is a non-zero integer.

Optionally, the processor 1101 is further configured to: determine a frequency offset value of the terminal device according to the SRS and a DM-RS on the PUSCH at the 0.5-millisecond TTI or according to a DM-RS and an SRS that are on the same frequency domain resource in the SRS as on the PUSCH at the 0.5-millisecond TTI; and determine the historical frequency offset value of the terminal device according to the frequency offset value of the terminal device.

In this manner, the eNodeB sends DCI to the terminal device by using a PDCCH or an EPDCCH, and indicates the uplink frequency domain resource for the PUSCH at the 0.5-millisecond TTI to the terminal device in the DCI. The uplink frequency domain resource of the terminal device for the PUSCH at the 0.5-millisecond TTI needs to have a same frequency domain resource as the SRS sent by the terminal device.

The eNodeB knows a sending time of a periodic or aperiodic SRS of each terminal device. Therefore, within a preset time interval before or after the terminal device sends the SRS, the eNodeB may schedule the terminal device to send a PUSCH, so that an uplink frequency domain resource on which the terminal device sends the SRS has a same frequency domain resource as an uplink frequency domain resource on which the terminal device is scheduled to send the PUSCH, thereby determining the frequency offset value of the terminal device.

The eNodeB determines the frequency offset value according to a phase difference between the uplink frequency domain resource for the SRS sent by the terminal device and the DM-RS on the PUSCH sent by the terminal device at the 0.5-millisecond TTI. Alternatively, the eNodeB determines the frequency offset value according to a phase difference between the uplink frequency domain resource for the SRS sent by the terminal device and the DM-RS in a frequency domain with the same PRB index or the same RBG index of the terminal device at the 0.5-millisecond TTI.

The uplink frequency domain resource for the SRS includes an entire code sequence of the SRS. The PUSCH sent by the terminal device at the 0.5-millisecond TTI includes an entire code sequence of the DM-RS. The base station may determine the frequency offset value according to a phase difference between the two code sequences.

A code sequence of the DM-RS on the frequency domain resource with the same PRB index or the same RBG index in the SRS as on the PUSCH sent at the 0.5-millisecond TTI may not be an entire code sequence of the DM-RS, that is. is merely a partial code sequence of the DM-RS on the PUSCH. Alternatively, a code sequence of the SRS in the frequency domain with the same PRB index or the same RBG index in the SRS as on the PUSCH sent at the 0.5-millisecond TTI may not be an entire code sequence of the SRS, that is, is merely a partial code sequence of the SRS on the PUSCH. The terminal device determines the frequency offset value according to a phase difference between the code sequence of the SRS and the code sequence of the DM-RS. The code sequence of the SRS may be the entire code sequence of the SRS, or may be the partial code sequence of the SRS. The code sequence of the DM-RS may be the entire code sequence of the DM-RS, or may be the partial code sequence of the DM-RS.

The code sequence may be any digital sequence, and is not limited herein, for example, a ZC (Zadoff-Chu) sequence.

In this embodiment, the PUSCH is a physical channel used to carry uplink data of the terminal device, and may also be used to transmit UCI of the terminal device.

Alternatively, the base station in this embodiment may implement the procedure implemented on a base station side in the embodiment of the present disclosure shown in FIG. 6.

Optionally, the transmitter 1102 is further configured to: after it is detected that the terminal device reaches a first estimation threshold, send random access procedure indication information to the terminal device by using a physical downlink control channel PDCCH. That it is detected that the terminal device reaches a first estimation threshold includes: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device.

Optionally, the receiver 1103 is further configured to receive an uplink channel that is in a random access procedure and sent by the terminal device according to the random access procedure indication information.

Optionally, the processor 1101 is further configured to: determine a frequency offset value of the terminal device according to a DM-RS and/or a preamble sequence on the uplink channel that is in the random access procedure and sent by the terminal device, where the uplink channel includes a physical random access channel PRACH and/or a PUSCH; and determine the historical frequency offset value of the terminal device according to the frequency offset value of the terminal device.

1-millisecond-TTI uplink information transmission is to be performed on the PRACH and/or the PUSCH sent after the terminal device triggers the random access procedure. Correspondingly, when the terminal device performs 1-millisecond-TTI uplink information transmission, the eNodeB determines the frequency offset value by using a offset of a preamble sequence on the PRACH sent by the terminal device or a phase difference between two DM-RSs on the PUSCH sent by the terminal device. For example, the base station determines an uplink frequency offset value of the terminal device according to a offset status of the preamble sequence in the random access procedure.

In this embodiment, the PUSCH is a physical channel used to carry uplink data of the terminal device, and may also be used to transmit UCI of the terminal device. The PRACH is used by the terminal to initiate communication with the base station. The terminal sends preamble information when performing random access. The base station receives and determines, by using the PRACH, an identity of the terminal that performs access, and calculates a delay of the terminal.

Alternatively, the base station in this embodiment may implement the procedure implemented on a base station side in the embodiment of the present disclosure shown in FIG. 7.

Optionally, the receiver 1103 is further configured to receive an uplink channel that is in a random access procedure and sent by the terminal device after the terminal device detects that the terminal device reaches a second estimation threshold. The uplink channel includes a PRACH and/or a PUSCH. The second estimation threshold includes: one or more of the following parameters reach a specified threshold: a moving speed of the terminal device, a difference between an expected MCS index value and an MCS index received by the terminal device, or a difference between an MCS index received by the terminal device and an MCS index corresponding to a CQI reported by the terminal device.

Optionally, the processor 1101 is further configured to: determine a frequency offset value of the terminal device according to the uplink channel in the random access procedure triggered by the terminal device after the terminal device detects that the terminal device reaches the second estimation threshold, where the uplink channel includes the PRACH and/or the PUSCH; and determine the historical frequency offset value of the terminal device according to the frequency offset value of the terminal device.

In this embodiment, the PUSCH is a physical channel used to carry uplink data of the terminal device, and may also be used to transmit UCI of the terminal device. The PRACH is used by the terminal to initiate communication with the base station. The terminal sends preamble information when performing random access. The base station receives and determines, by using the PRACH, an identity of the terminal that performs access; and calculates a delay of the terminal.

Alternatively, the base station in this embodiment may implement the procedure implemented on a base station side in the embodiment of the present disclosure shown in FIG. 8.

According to this embodiment of the present disclosure, after the MCS index is selected for the terminal device, reduction processing is performed on the MCS index according to a preset MCS index reduction exponent, a reduced MCS index is indicated to the terminal device, frequency offset estimation is performed on the terminal device by using the recorded historical frequency offset value, and the PUSCH sent by the terminal device according to the reduced MCS index is demodulated after the frequency offset estimation. Frequency calibration is performed by using the prerecorded historical frequency offset value, so that the frequency offset value does not need to be determined in an existing manner of adding a DM-RS symbol to a 0.5-millisecond TTI. Therefore, fewer resources are occupied, data transmission efficiency is improved, and reference signal system overheads are reduced.

In addition, the terminal device performs 1-millisecond-TTI uplink information transmission, and the historical frequency offset value of the terminal device is determined based on the DM-RSs on the PUSCH at the 1-millisecond TTI. Alternatively, the terminal device is instructed to send the PUSCHs at the two 0.5-millisecond TTIs, and the base station determines the historical frequency offset value of the terminal device based on the two received DM-RSs on the PUSCHs sent at the two 0.5-millisecond TTIs. Alternatively, the terminal device is instructed to send the PUSCH at the 1-millisecond TTI, and the base station determines the historical frequency offset value of the terminal device based on the two received DM-RSs on the PUSCH at the 1-millisecond TTI. Alternatively, the terminal device is instructed to send the PUSCH at the 0.5-millisecond TTI and send the SRS, and the base station determines the historical frequency offset value of the terminal device based on the received SRS and the received DM-RS on the PUSCH at the 0.5-millisecond TTI. Alternatively, the terminal device is instructed to send the uplink channel in the random access procedure, and the base station determines the historical frequency offset value of the terminal device based on the received DM-RSs on the uplink channel that is in the random access procedure and sent by the terminal device. Alternatively, when the terminal device reaches the second estimation threshold, the terminal device triggers sending of the uplink channel in the random access procedure, and the base station determines the historical frequency offset value of the terminal device based on the uplink channel that is in the random access procedure and sent by the terminal device. The base station determines the historical frequency offset value in the foregoing manners, so that the frequency offset value does not need to be determined in the existing manner of adding a DM-RS symbol to a 0.5-millisecond TTI. Therefore, fewer resources are occupied, data transmission efficiency is improved, and reference signal system overheads are reduced.

Embodiment 7

Figure 12:
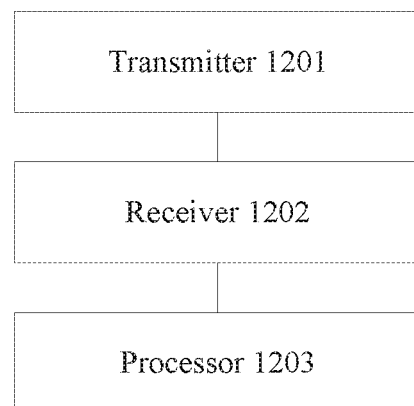
FIG. 12 is a schematic structural diagram of a terminal device according to Embodiment 7 of the present disclosure.

Referring to FIG. 12, this embodiment of the present disclosure provides a terminal device.

The terminal device includes a transmitter 1201 and a receiver 1202.

The receiver 1202 is configured to receive a second modulation and coding scheme MCS index, where the second MCS index is obtained after a base station performs reduction processing on a first MCS index according to an MCS index reduction value, and the first MCS index is selected by the base station according to channel quality of the terminal device and/or a received target block error rate BLER of a physical uplink shared channel PUSCH of the terminal device.

The transmitter 1201 is configured to send uplink information according to the second MCS index.

The uplink information may include a reference signal, a sounding signal, and a physical channel.

The terminal device in this embodiment may implement the procedure in the embodiment of the present disclosure shown in FIG. 2.

Optionally, the receiver 1202 is further configured to receive at least one piece of first resource indication information. The first resource indication information is used to indicate uplink frequency domain resources for PUSCHs at two 0.5-millisecond TTIs, the uplink frequency domain resources for sending the PUSCHs at the two 0.5-millisecond TTIs include at least one same physical resource block PRB index or include at least one same resource block group RBG index, a time interval between the two 0.5-millisecond TTIs is less than or equal to n*0.5 milliseconds, and n is a non-zero positive integer.

Optionally, the transmitter 1201 is further configured to send the PUSCHs at the two 0.5-millisecond TTIs according to the first resource indication information.

In this embodiment, the PUSCH is a physical channel used to carry uplink data of the terminal device, and may also be used to transmit UCI of the terminal device.

Alternatively, the terminal device in this embodiment may implement the procedure implemented on a terminal device side in the embodiment of the present disclosure shown in FIG. 4.

Optionally, the terminal device further includes a processor 1203.

Optionally; the receiver 1202 is further configured to receive mode instruction information. The mode instruction information is used to instruct the terminal device to change from a mode of sending 0.5-millisecond-TTI uplink information to a mode of sending 1-millisecond-TTI uplink information.

Optionally, the processor 1203 is configured to change, according to the mode instruction information, from the mode of sending 0.5-millisecond TTI uplink information to the mode of sending 1-millisecond-TTI uplink information.

It should be noted that, that the terminal device changes, according to the mode instruction information, from the mode of sending 0.5-millisecond-TTI uplink information to the mode of sending 1-millisecond-TTI uplink information may be: after receiving the mode instruction information, the terminal device immediately changes to the mode of sending 1-millisecond-TTI uplink information; or may be: after X slots, the terminal device changes to the mode of sending 1-millisecond-TTI uplink information. X is a positive integer greater than or equal to 6.

Optionally; the transmitter 1201 is further configured to send a PUSCH at a 1-millisecond TTI.

In this embodiment, the PUSCH is a physical channel used to carry uplink data of the terminal device, and may also be used to transmit UCI of the terminal device.

Alternatively, the terminal device in this embodiment may implement the procedure implemented on a terminal device side in the embodiment of the present disclosure shown in FIG. 5.

Optionally, the receiver 1202 is further configured to receive at least one piece of second resource indication information. The second resource indication information is used to indicate an uplink frequency domain resource for a PUSCH at a 0.5-millisecond TTI.

Optionally, the transmitter 1201 is further configured to: send the PUSCH at the 0.5-millisecond TTI according to the second resource indication information, and send an SRS.

The uplink frequency domain resource for the PUSCH sent at the 0.5-millisecond TTI includes at least one same PRB index or includes at least one same RBG index as an uplink frequency domain resource on which the SRS is located, a preset time interval is less than or equal to m*0.5 milliseconds, and m is a non-zero integer.

If m is a negative integer, it indicates that the PUSCH is sent before a symbol on which the SRS is located. If m is a positive integer, it indicates that the PUSCH is sent after a symbol on which the SRS is located.

In this embodiment, the PUSCH is a physical channel used to carry uplink data of the terminal device, and may also be used to transmit UCI of the terminal device.

Alternatively, the terminal device in this embodiment may implement the procedure implemented on a terminal device side in the embodiment of the present disclosure shown in FIG. 6.

Optionally, the receiver 1202 is further configured to receive random access procedure indication information sent by using a PDCCH.

Optionally, the transmitter 1201 is further configured to send an uplink channel in a random access procedure according to the random access procedure indication information. The uplink channel includes a PRACH and/or a PUSCH.

1-millisecond-TTI uplink information transmission is to be performed on the PRACH and/or the PUSCH sent after the terminal device triggers the random access procedure.

In this embodiment, the PUSCH is a physical channel used to carry uplink data of the terminal device, and may also be used to transmit UCI of the terminal device. The PRACH is used by the terminal to initiate communication with the base station. The terminal sends preamble information when performing random access. The base station receives and determines, by using the PRACH, an identity of the terminal that performs access; and calculates a delay of the terminal.

Alternatively, the terminal device in this embodiment may implement the procedure implemented on a terminal device side in the embodiment of the present disclosure shown in FIG. 7.

Optionally, the terminal device further includes a processor 1203.

Optionally, the processor 1203 is configured to detect whether the terminal device reaches a second estimation threshold. The second estimation threshold includes: one or more of the following parameters reach a specified threshold: a moving speed, a difference between an expected MCS index value and a received MCS index, or a difference between an MCS index received by the terminal device and an MCS index corresponding to a CQI reported by the terminal device.

Optionally, the transmitter 1201 is further configured to: after it is detected that the terminal device reaches the second estimation threshold, send an uplink channel in a random access procedure. The uplink channel includes a PRACH and/or a PUSCH.

1-millisecond-TTI uplink information transmission is to be performed on the PRACH and/or the PUSCH sent after the terminal device triggers the random access procedure.

In this embodiment, the PUSCH is a physical channel used to carry uplink data of the terminal device, and may also be used to transmit UCI of the terminal device. The PRACH is used by the terminal to initiate communication with the base station. The terminal sends preamble information when performing random access. The base station receives and determines, by using the PRACH, an identity of the terminal that performs access; and calculates a delay of the terminal.

Alternatively, the terminal device in this embodiment may implement the procedure implemented on a terminal device side in the embodiment of the present disclosure shown in FIG. 8.

According to this embodiment of the present disclosure, the terminal device sends the uplink information according to a reduced MCS index, so as to reduce a rate at which the terminal device sends the uplink information to the base station. In this way, when frequency calibration performed by the base station by using a historical frequency offset value is inaccurate, reliability of the uplink information is improved, and an accuracy rate of the uplink information sent by the terminal device is accordingly improved.

Embodiment 8

Figure 13:
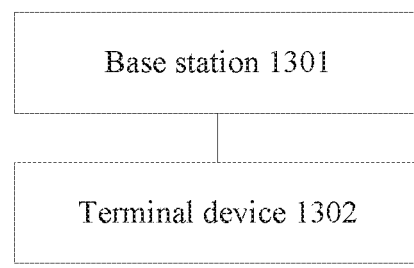
FIG. 13 is a schematic structural diagram of an uplink information demodulation system according to Embodiment 8 of the present disclosure.

Referring to FIG. 13, this embodiment of the present disclosure provides an uplink information demodulation system.

The system includes a base station 1301 and a terminal device 1302.

The base station 1301 includes:

a selection module, configured to select a first MCS index for a terminal device according to channel quality of the terminal device and/or a received BLER of a PUSCH of the terminal device;

a first determining module, configured to determine a second MCS index according to an MCS index reduction value and the first MCS index, where the MCS index reduction value is used to perform reduction processing on the first MCS index to obtain the second MCS index;

a first sending module, configured to send the second MCS index to the terminal device;

a calibration module, configured to perform frequency offset calibration on a frequency of the terminal device according to a historical frequency offset value of the terminal device, where the historical frequency offset value is a stored frequency offset value of the terminal device; and a first receiving module, configured to: receive uplink information sent by the terminal device according to the second MCS index, and demodulate the PUSCH according to a frequency obtained after the frequency offset calibration.

The terminal device 1302 includes:

a second receiving module, configured to receive the second MCS index, where the second MCS index is obtained after the base station performs reduction processing on the first MCS index according to the MCS index reduction value, and the first MCS index is selected by the base station according to the channel quality of the terminal device and/or the received target block error rate BLER of the PUSCH of the terminal device; and a second sending module, configured to send the uplink information according to the second MCS index.

According to the system in this embodiment of the present disclosure, the procedures implemented on a base station side and a terminal device side in the embodiments of the present disclosure shown in FIG. 1 and FIG. 2 may be implemented.

Further, according to the system in this embodiment of the present disclosure, the procedures of determining the frequency offset value of the terminal device that are implemented on the base station side and the terminal device side in the embodiments of the present disclosure shown in FIG. 3 to FIG. 8 may be implemented.

According to this embodiment of the present disclosure, after the MCS index is selected for the terminal device, reduction processing is performed on the MCS index according to a preset MCS index reduction exponent, a reduced MCS index is indicated to the terminal device, frequency offset estimation is performed on the terminal device by using the recorded historical frequency offset value, and the PUSCH sent by the terminal device according to the reduced MCS index is demodulated after the frequency offset estimation. Frequency calibration is performed by using the prerecorded historical frequency offset value, so that the frequency offset value does not need to be determined in an existing manner of adding a DM-RS symbol to each 0.5-millisecond TTI. Therefore, fewer reference signal resources are occupied, data transmission efficiency is improved, and reference signal system overheads are reduced.

In addition, according to this embodiment of the present disclosure, the terminal device sends the uplink information according to the reduced MCS index, so as to reduce a rate at which the terminal device sends the uplink information to the base station. In this way, when frequency calibration performed by the base station by using the historical frequency offset value is inaccurate, reliability of the uplink information is improved, and an accuracy rate of the uplink information sent by the terminal device is accordingly improved.

A person of ordinary skill in the art may understand that all or some of the steps of the embodiments may be implemented by hardware or a program instructing related hardware. The program may be stored in a computer-readable storage medium. The mentioned storage medium may be a read-only memory, a magnetic disk, an optical disc, or the like.

The foregoing descriptions are merely examples of the embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. An uplink information demodulation method, wherein the method comprises:

selecting, by a base station, a first modulation and coding scheme (MCS) index for a terminal device according to channel quality information of the terminal device and/or a received target block error rate (BLER) of a physical uplink shared channel (PUSCH) of the terminal device;

determining, by the base station, a second MCS index according to an MCS index reduction value and the first MCS index, wherein the MCS index reduction value is used to perform reduction processing on the first MCS index to obtain the second MCS index;

sending, by the base station, the second MCS index to the terminal device;

performing, by the base station, frequency offset calibration on a frequency of the terminal device according to a historical frequency offset value of the terminal device, wherein the historical frequency offset value is a frequency offset value of the terminal device that is stored in the base station; and receiving, by the base station, uplink information sent by the terminal device according to the second MCS index, and demodulating the uplink information according to a frequency obtained after the frequency offset calibration.

2. The method according to claim 1, wherein the method further comprises:

after the terminal device performs 1-millisecond-TTI uplink information transmission, determining, by the base station, a frequency offset value of the terminal device according to DM-RSs on a PUSCH that is at a 1-millisecond TTI and sent by the terminal device; and determining, by the base station, the historical frequency offset value of the terminal device according to the frequency offset value of the terminal device.

3. The method according to claim 1, wherein the method further comprises:

after detecting that the terminal device reaches a first estimation threshold, sending, by the base station, mode instruction information to the terminal device, wherein the mode instruction information is used to instruct the terminal device to change from a mode of sending 0.5-millisecond-TTI uplink information to a mode of sending 1-millisecond-TTI uplink information, wherein that the base station detects that the terminal device reaches a first estimation threshold comprises: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

receiving, by the base station, a PUSCH that is at a 1-millisecond TTI and sent by the terminal device;

determining, by the base station, a frequency offset value of the terminal device according to DM-RSs on the PUSCH that is at the 1-millisecond TTI and sent by the terminal device; and determining, by the base station, the historical frequency offset value of the terminal device according to the frequency offset value of the terminal device.

4. The method according to claim 1, wherein the method further comprises:

after detecting that the terminal device reaches a first estimation threshold, sending, by the base station, at least one piece of second resource indication information to the terminal device within a preset time interval contiguous to a moment at which the terminal device sends a sounding reference signal SRS, wherein the second resource indication information is used to indicate an uplink frequency domain resource for a PUSCH at a 0.5-millisecond TTI, and that the base station detects that the terminal device reaches a first estimation threshold comprises: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

receiving, by the base station, the PUSCH that is at the 0.5-millisecond TTI and sent by the terminal device, and receiving, by the base station, the SRS sent by the terminal device, wherein the uplink frequency domain resource for the PUSCH sent at the 0.5-millisecond TTI comprises at least one same frequency domain resource as an uplink frequency domain resource on which the SRS is located, the preset time interval is less than or equal to m*0.5 milliseconds, and m is a non-zero integer;

determining, by the base station, a frequency offset value of the terminal device according to the SRS and a DM-RS on the PUSCH at the 0.5-millisecond TTI or according to a DM-RS and an SRS that are on the same frequency domain resource on the uplink frequency domain resource for the SRS as on the uplink frequency domain resource for the PUSCH at the 0.5-millisecond TTI; and determining, by the base station, the historical frequency offset value of the terminal device according to the frequency offset value of the terminal device.

5. The method according to claim 1, wherein the method further comprises:

after detecting that the terminal device reaches a first estimation threshold, sending, by the base station, random access procedure indication information to the terminal device by using a physical downlink control channel (PDCCH), wherein the detecting that the terminal device reaches a first estimation threshold comprises: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

receiving, by the base station, an uplink channel that is in a random access procedure and sent by the terminal device according to the random access procedure indication information;

determining, by the base station, a frequency offset value of the terminal device according to a DM-RS and/or a preamble sequence on the uplink channel that is in the random access procedure and sent by the terminal device, wherein the uplink channel comprises a physical random access channel (PRACH) and/or a PUSCH; and determining, by the base station, the historical frequency offset value of the terminal device according to the frequency offset value of the terminal device.

6. The method according to claim 1, wherein the method further comprises:

receiving, by the base station, an uplink channel that is in a random access procedure and sent by the terminal device after the terminal device detects that the terminal device reaches a second estimation threshold, wherein the uplink channel comprises a PRACH and/or a PUSCH, and the second estimation threshold comprises: one or more of the following parameters reach a specified threshold: a moving speed of the terminal device, a difference between a value of an MCS index and an expected value of an MCS index received by the terminal device, or a difference between an MCS index received by the terminal device and an MCS index corresponding to a channel quality indicator (CQI) reported by the terminal device;

determining, by the base station, a frequency offset value of the terminal device according to the uplink channel in the random access procedure triggered by the terminal device after the terminal device detects that the terminal device reaches the second estimation threshold, wherein the uplink channel comprises the PRACH and/or the PUSCH; and determining, by the base station, the historical frequency offset value of the terminal device according to the frequency offset value of the terminal device.

7. A base station, wherein the base station comprises a processor, a transmitter and a receiver, wherein the processor is configured to: select a first modulation and coding scheme (MCS) index for a terminal device according to channel quality information of the terminal device and/or a received target block error rate (BLER) of a physical uplink shared channel (PUSCH) of the terminal device; determine a second MCS index according to an MCS index reduction value and the first MCS index, wherein the MCS index reduction value is used to perform reduction processing on the first MCS index to obtain the second MCS index; perform frequency offset calibration on a frequency of the terminal device according to a historical frequency offset value of the terminal device, wherein the historical frequency offset value is a frequency offset value of the terminal device that is stored in the base station; and demodulate the uplink information according to a frequency obtained after the frequency offset calibration;

the transmitter is configured to send the second MCS index to the terminal device; and the receiver is configured to receive uplink information sent by the terminal device according to the second MCS index.

8. The base station according to claim 7, wherein the processor is further configured to: after the terminal device performs 1-millisecond-TTI uplink information transmission, determine a frequency offset value of the terminal device according to DM-RSs on a PUSCH that is at a 1-millisecond TTI and sent by the terminal device; and determine the historical frequency offset value of the terminal device according to the frequency offset value of the terminal device.

9. The base station according to claim 7, wherein the transmitter is further configured to: after it is detected that the terminal device reaches a first estimation threshold, send mode instruction information to the terminal device, wherein the mode instruction information is used to instruct the terminal device to change from a mode of sending 0.5-millisecond-TTI uplink information to a mode of sending 1-millisecond-TTI uplink information, and that it is detected that the terminal device reaches a first estimation threshold comprises: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

the receiver is further configured to receive a PUSCH that is at a 1-millisecond TTI and sent by the terminal device; and the processor is further configured to: determine a frequency offset value of the terminal device according to DM-RSs on the PUSCH that is at the 1-millisecond TTI and sent by the terminal device; and determine the historical frequency offset value of the terminal device according to the frequency offset value of the terminal device.

10. The base station according to claim 7, wherein the transmitter is further configured to: after it is detected that the terminal device reaches a first estimation threshold, send at least one piece of second resource indication information to the terminal device within a preset time interval contiguous to a moment at which the terminal device sends a sounding reference signal SRS, wherein the second resource indication information is used to indicate an uplink frequency domain resource for a PUSCH at a 0.5-millisecond TTI, and that it is detected that the terminal device reaches a first estimation threshold comprises: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

the receiver is further configured to: receive the PUSCH that is at the 0.5-millisecond TTI and sent by the terminal device, and receive the SRS sent by the terminal device, wherein the uplink frequency domain resource for the PUSCH sent at the 0.5-millisecond TTI comprises at least one same frequency domain resource as an uplink frequency domain resource on which the SRS is located, the preset time interval is less than or equal to m*0.5 milliseconds, and m is a non-zero integer; and the processor is further configured to: determine a frequency offset value of the terminal device according to the SRS and a DM-RS on the PUSCH at the 0.5-millisecond TTI or according to a DM-RS and an SRS that are on the same frequency domain resource in the SRS as on the PUSCH at the 0.5-millisecond TTI; and determine the historical frequency offset value of the terminal device according to the frequency offset value of the terminal device.

11. The base station according to claim 7, wherein
the transmitter is further configured to: after it is detected that the terminal device reaches a first estimation threshold, send random access procedure indication information to the terminal device by using a physical downlink control channel PDCCH, wherein that it is detected that the terminal device reaches a first estimation threshold comprises: one or more of the following parameters reach a specified threshold: a moving speed of the terminal device, a mean MCS change value of the terminal device, an MCS variance of the terminal device, the received BLER of the PUSCH of the terminal device, a quantity of HARQ retransmission times of a PUSCH of the terminal device, an error rate or a quantity of errors of a MAC packet/RLC packet/TCP packet/IP packet of the terminal device, a quantity of ARQs of a MAC packet of the terminal device, or QoS of a service corresponding to the terminal device;

the receiver is further configured to receive an uplink channel that is in a random access procedure and sent by the terminal device according to the random access procedure indication information; and the processor is further configured to: determine a frequency offset value of the terminal device according to a DM-RS and/or a preamble sequence on the uplink channel that is in the random access procedure and sent by the terminal device, wherein the uplink channel comprises a physical random access channel PRACH and/or a PUSCH; and determine the historical frequency offset value of the terminal device according to the frequency offset value of the terminal device.

12. The base station according to claim 7, wherein
the receiver is further configured to receive an uplink channel that is in a random access procedure and sent by the terminal device after the terminal device detects that the terminal device reaches a second estimation threshold, wherein the uplink channel comprises a PRACH and/or a PUSCH, and the second estimation threshold comprises: one or more of the following parameters reach a specified threshold: a moving speed of the terminal device, a difference between a value of an MCS index and an expected value of an MCS index received by the terminal device, or a difference between an MCS index received by the terminal device and an MCS index corresponding to a channel quality indicator CQI reported by the terminal device; and the processor is further configured to: determine a frequency offset value of the terminal device according to the uplink channel in the random access procedure triggered by the terminal device after the terminal device detects that the terminal device reaches the second estimation threshold, wherein the uplink channel comprises the PRACH and/or the PUSCH; and determine the historical frequency offset value of the terminal device according to the frequency offset value of the terminal device.

13. A terminal device, wherein the terminal device comprises a transmitter and a receiver, wherein
the receiver is configured to receive a second modulation and coding scheme (MCS) index, wherein the second MCS (index) is obtained after a base station performs reduction processing on a first MCS index according to an MCS index reduction value, and the first MCS index is selected by the base station according to channel quality information of the terminal device and/or a received target block error rate (BLER) of a physical uplink shared channel (PUSCH) of the terminal device; and the transmitter is configured to send uplink information according to the second MCS index.

14. The terminal device according to claim 13, wherein
the receiver is further configured to receive at least one piece of first resource indication information, wherein the first resource indication information is used to indicate uplink frequency domain resources for PUSCHs at two 0.5-millisecond TTIs, the uplink frequency domain resources for sending the PUSCHs at the two 0.5-millisecond TTIs comprise at least one same physical resource block PRB index or comprise at least one same resource block group RBG index, a time interval between the two 0.5-millisecond TTIs is less than or equal to n*0.5 milliseconds, and n is a non-zero positive integer; and the transmitter is further configured to send the PUSCHs at the two 0.5-millisecond TTIs according to the first resource indication information.

15. The terminal device according to claim 13, wherein
the receiver is further configured to receive at least one piece of second resource indication information, wherein the second resource indication information is used to indicate an uplink frequency domain resource for a PUSCH at a 0.5-millisecond TTI; and the transmitter is further configured to: send the PUSCH at the 0.5-millisecond TTI according to the second resource indication information, and send an SRS, wherein the uplink frequency domain resource for the PUSCH sent at the 0.5-millisecond TTI comprises at least one same PRB index or comprises at least one same RBG index as an uplink frequency domain resource on which the SRS is located, a preset time interval is less than or equal to m*0.5 milliseconds, and m is a non-zero integer.

16. The terminal device according to claim 13, wherein
the receiver is further configured to receive random access procedure indication information sent by using a PDCCH; and the transmitter is further configured to send an uplink channel in a random access procedure according to the random access procedure indication information, wherein the uplink channel comprises a PRACH and/or a PUSCH.

17. The terminal device according to claim 13, wherein
the terminal device further comprises a processor, wherein
the processor is configured to detect whether the terminal device reaches a second estimation threshold, wherein the second estimation threshold comprises: one or more of the following parameters reach a specified threshold: a moving speed of the terminal device, a difference between a value of an MCS index and an expected value of an MCS index, or a difference between an MCS index received by the terminal device and an MCS index corresponding to a channel quality indicator CQI reported by the terminal device; and the transmitter is further configured to: after it is detected that the terminal device reaches the second estimation threshold, send an uplink channel in a random access procedure, wherein the uplink channel comprises a PRACH and/or a PUSCH.

* * * * *

UNITED STATES PATENT AND TRADEMARK OFFICE
CERTIFICATE OF CORRECTION

PATENT NO. : 10,374,770 B2
APPLICATION NO. : 15/919687
DATED : August 6, 2019
INVENTOR(S) : Jiafeng Shao et al.

It is certified that error appears in the above-identified patent and that said Letters Patent is hereby corrected as shown below:

On the Title Page

Item (57), Line 3:
In the Abstract, after "demodulation" delete "system." And insert -- system, --, therefor.

Signed and Sealed this
Twenty-fourth Day of December, 2019

Andrei Iancu
*Director of the United States Patent and Trademark Office*